(12) United States Patent
Turgeon et al.

(10) Patent No.: US 8,852,410 B1
(45) Date of Patent: Oct. 7, 2014

(54) ELECTROLYTIC HYDROGEN GENERATOR AND METHOD

(76) Inventors: Luke J. Turgeon, Shillington, PA (US); Eric E. Turgeon, Shillington, PA (US)

( * ) Notice: Subject to any disclaimer, the term of this patent is extended or adjusted under 35 U.S.C. 154(b) by 129 days.

(21) Appl. No.: 13/350,221

(22) Filed: Jan. 13, 2012

Related U.S. Application Data

(60) Provisional application No. 61/433,246, filed on Jan. 16, 2011, provisional application No. 61/465,223, filed on Mar. 16, 2011.

(51) Int. Cl.
- *C25B 1/12* (2006.01)
- *C25B 9/06* (2006.01)
- *C25B 15/02* (2006.01)

(52) U.S. Cl.
CPC ............. *C25B 9/06* (2013.01); *Y02E 60/366* (2013.01); *C25B 15/02* (2013.01); *C25B 1/12* (2013.01)
USPC ........... 204/267; 204/268; 204/269; 204/270; 205/628

(58) Field of Classification Search
None
See application file for complete search history.

(56) References Cited

U.S. PATENT DOCUMENTS

| | | | | |
|---|---|---|---|---|
| 3,660,593 A * | 5/1972 | Bowles | ...................... | 174/152 R |
| 4,014,777 A * | 3/1977 | Brown | ...................... | 204/228.5 |
| 4,184,931 A * | 1/1980 | Inoue | ...................... | 205/341 |
| 4,224,388 A * | 9/1980 | Stadnick | ...................... | 429/181 |
| 4,369,737 A * | 1/1983 | Sanders et al. | ...................... | 123/3 |
| 4,379,043 A * | 4/1983 | Chappelle | ...................... | 204/228.5 |
| 4,442,801 A * | 4/1984 | Glynn et al. | ...................... | 123/3 |
| 5,513,600 A * | 5/1996 | Teves | ...................... | 123/3 |
| 5,623,125 A * | 4/1997 | Pioch | ...................... | 174/152 R |
| 5,711,865 A * | 1/1998 | Caesar | ...................... | 205/628 |
| 5,753,098 A * | 5/1998 | Bess et al. | ...................... | 205/501 |
| 5,837,399 A * | 11/1998 | Oswald et al. | ...................... | 429/178 |
| 6,311,648 B1 * | 11/2001 | Larocque | ...................... | 123/3 |
| 6,336,430 B2 * | 1/2002 | de Souza et al. | ...................... | 123/3 |
| 6,972,077 B2 * | 12/2005 | Tipton et al. | ...................... | 204/269 |
| 7,318,885 B2 * | 1/2008 | Omasa | ...................... | 204/273 |
| 7,430,991 B2 * | 10/2008 | VanHoose et al. | ...................... | 123/3 |
| 7,510,633 B2 * | 3/2009 | Shimko et al. | ...................... | 204/260 |
| 8,168,047 B1 * | 5/2012 | Smith | ...................... | 204/255 |
| 8,282,812 B2 * | 10/2012 | Burtch | ...................... | 205/639 |
| 2002/0074237 A1 * | 6/2002 | Takesako et al. | ............. | 205/628 |
| 2010/0180837 A1 * | 7/2010 | High | ...................... | 123/3 |
| 2010/0275859 A1 * | 11/2010 | Klotz | ...................... | 123/3 |
| 2011/0057455 A1 * | 3/2011 | Russo et al. | ................. | 290/1 A |

(Continued)

OTHER PUBLICATIONS

"Will KOH corrode my copper tubing", HHO Forums, May 2009 to Nov. 2010, accessed onn Oct. 23, 2013 (http://www.hhoforums.com/showthread.php?3720-Will-KOH-corrode-my-copper-tubing) (Author unknown).*

"Support." Merriam-Webster.com. Merriam-Webster, n.d. Web. May 29, 2014. <http://www.merriam-webster.com/dictionary/support>.*

(Continued)

*Primary Examiner* — Harry D Wilkins, III

(74) *Attorney, Agent, or Firm* — Robert J. Yarbrough; Lipton, Weinberger & Husick

(57) ABSTRACT

An electrolytic generator to produce a stoichiometric mixture of hydrogen gas and oxygen gas features a case penetration. An electrode extends through the case penetration and clamps a support plate to the inside of the case. The electrode and the support plate are electrically insulated from the case by a non-conducting bushing located within the case and between the support plate and the inside surface of the case. First and second plates are interleaved and maintained in a spaced apart relation along the first and second plate fasteners.

17 Claims, 34 Drawing Sheets

(56) References Cited

U.S. PATENT DOCUMENTS

Figure 1:
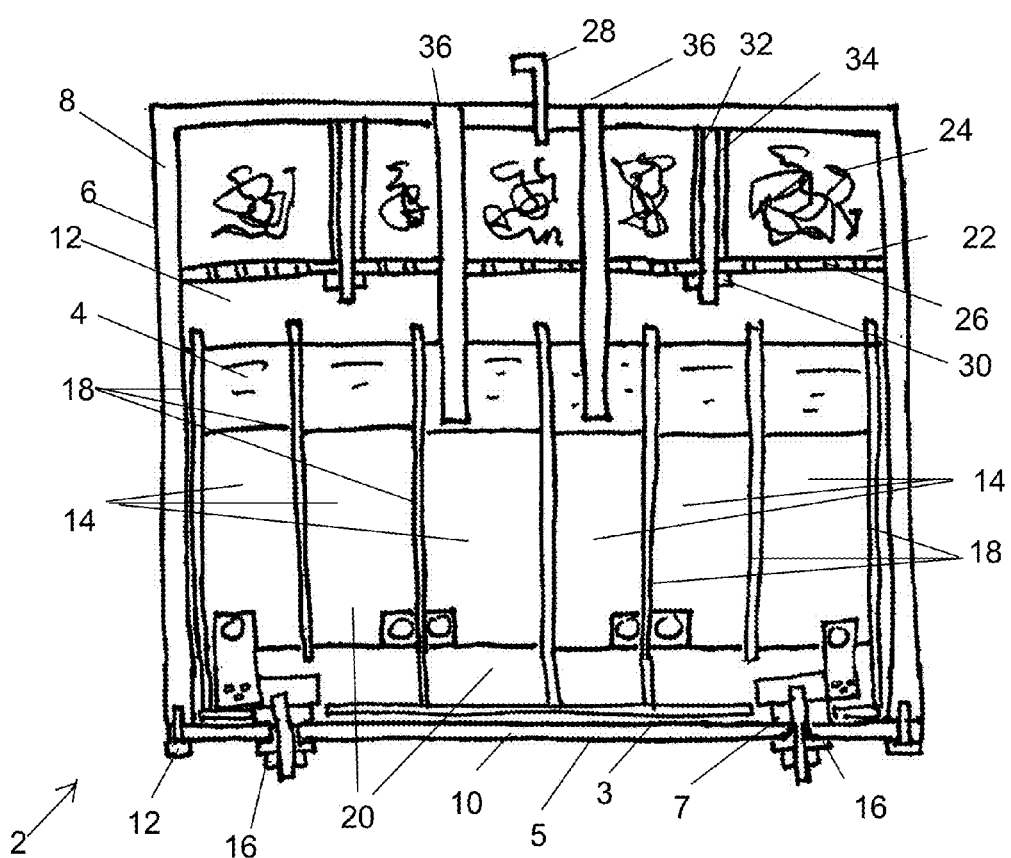

| | | | |
|---|---|---|---|
| 2011/0253070 A1* | 10/2011 | Haring | 123/3 |
| 2012/0111734 A1* | 5/2012 | Kramer | 205/412 |
| 2012/0234265 A1* | 9/2012 | Ball | 123/3 |

OTHER PUBLICATIONS

"Acrylic HHO Generator Video 2", from https://www.youtube.com/watch?v=ab3-29agvoQ, uploaded on Jul. 16, 2008 by user "TattooTom69", accessed on May 28, 2014.*

* cited by examiner

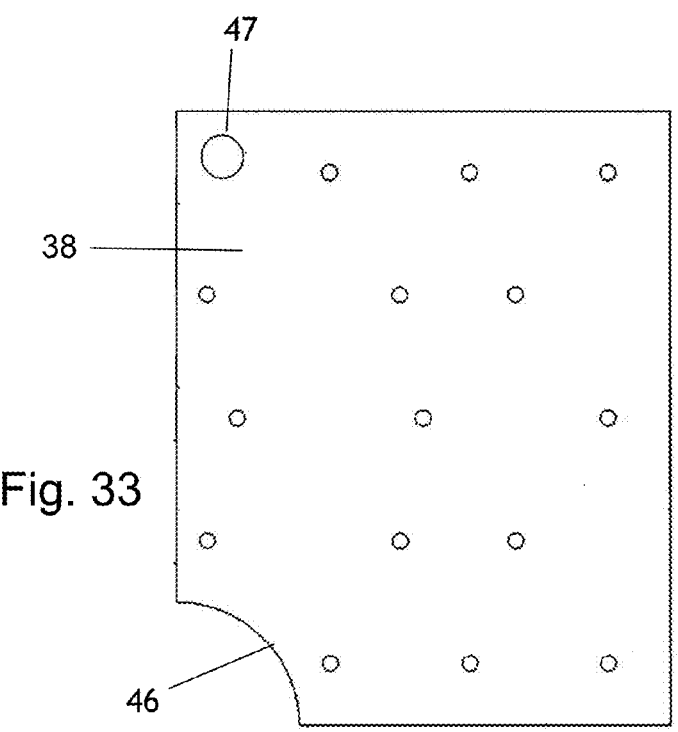
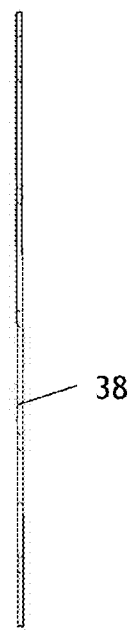
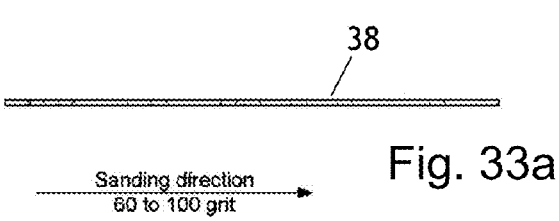
Fig. 33
Fig. 33b
Fig. 33a
Sanding direction
60 to 100 grit

ELECTROLYTIC HYDROGEN GENERATOR AND METHOD

I. RELATED APPLICATIONS

This application claims priority from U.S. Provisional Patent Applications 61/433,246 filed Jan. 16, 2011 and 61/465,223 filed May 16, 2011, by Luke J. Turgeon, et. al., which are incorporated by reference as if set forth in full herein.

II. BACKGROUND OF THE INVENTION

A. Field of the Invention

The Invention relates to the generation of hydrogen through electrolysis. The Invention relates particularly to the on-demand generation of hydrogen for the purpose of improving combustion of fossil fuels such as gasoline or diesel fuel in an internal combustion engine. The invention may be utilized either as a mobile source of hydrogen on a moving motor vehicle or for a stationary engine or for any application where a stoichiometric mixture of hydrogen and oxygen ('HHO') is needed, such as for a torch. The invention also relates to the conduct of any electrolytic reaction and is a method of generating hydrogen gas using the HHO generator of the Invention.

B. Description of the Related Art

The fundamental concept of an internal combustion engine is to compress air mixed with a combustible fuel; that is, a substance that reacts with oxygen and gives off heat. The increase in temperature caused by the combustion increases the pressure on a mechanical piston that generates mechanical work usually in the form of rotational motion.

A fundamental limitation of internal combustion engines is the combustion rate of the fuel. In most piston engines the combustion process begins when the rotational location of the crankshaft is 10 to 30 degrees before top dead center (TDC) and is not fully completed until after the completion of the power stroke. By increasing the combustion rate more power can be extracted from the fuel.

Hydrogen has one of the fastest combustion rates of any gas. Although pure hydrogen-fueled engines are possible and have been demonstrated, the wide adoption of hydrogen as a fuel requires major infrastructure improvements and poses a plethora of problems in generation, transportation and storage of the hydrogen gas.

Alternatively, the addition of a small percentage of hydrogen gas to the combustion chamber of a conventional gasoline or diesel internal combustion engine can have significant impact on not only the fuel consumption of the internal combustion engine but on unwanted emissions as well. This is analogous to adding kindling to start a wood fire—the kindling starts the fire much faster, but most of the energy is extracted from the logs. Internal combustion engines have the additional restriction that the fuel must burn in a very short time to produce mechanical energy, making the use of hydrogen as an accelerating fire starter even more beneficial.

Since hydrogen can be easily extracted from water using electrolysis, electricity generated from the engine itself can be used to produce hydrogen on demand, eliminating all the production, transportation and storage problems. For this approach to be beneficial in terms of fuel consumption the added output power of the engine must exceed the power used to generate the hydrogen.

Despite these benefits being well known for some time, no such on-demand hydrogen generation system has enjoyed significant commercial success. This lack of success is mostly attributable to the problems routinely encountered in the construction of such a system. The problems include but are not limited to lack of generation capacity, thermal stability, compactness, efficiency, chemical stablility, robustness (vibrations, shock, rain, wind, freezing, heat, etc.), flow control, electric source generator loading and vehicle or structure mounting.

One problem faced by prior art efforts to generate hydrogen for use in an internal combustion engine through electrolysis is the overheating of the electrolyte. Very high DC current flows are required for adequate hydrogen production. In a typical motor vehicle application, the DC power supply will provide a current of approximately 100 amps from a power supply of about 12 to 15 volts. As the temperature of the electrolyte increases, the DC resistance of the electrolyte drops. The drop in DC resistance causes even higher current flows, which can cause further heating of the electrolyte. The result is a spiraling temperature increase of the electrolyte until the electrolyte reaches boiling and produces steam, which mixes with the HHO gas. Boiling of the electrolyte results in failure of the hydrogen generator.

Leakage of hydrogen gas can be a problem for prior art electrolysis units. Hydrogen has a very low viscosity and can pass through conventional gaskets and sealants.

Leakage of electrical power can be a problem with prior art electrolysis units. Electrical power can leak between the electrodes and the case containing the electrolysis unit, resulting in a loss of power and efficiency of the unit.

The effective stripping of bubbles of oxygen and hydrogen from the electrodes can be a problem with prior art electrolysis units.

Controlling the amount of hydrogen and oxygen produced by the HHO generator can be a problem with prior art electrolysis units.

The inductive kick generated whenever the HHO generator is powered off can be a problem for prior art electrolysis units due to the very high current flows under which the units operate. The inductive kick is the tendency of the voltage to spike and to electrically arc after a circuit is abruptly opened due to induction from the wires connecting the electrical components together.

Mounting and construction of the electrodes within the HHO generator can be a problem with prior art electrolysis units, resulting in lost efficiency and low durability.

Chemical instability also can be a problem with prior art HHO generators. Chemical instability refers to problems that arise when the components of the generator are not chemically inert during operation. For example, aluminum parts inside the HHO generator will passivate the plates of the generator cores and significantly reduce the production of hydrogen by plating the cores with aluminum.

The hydrogen generator of the invention solves the problems presented by the prior art.

III. BRIEF DESCRIPTION OF THE INVENTION

The invention generates HHO, that is, a stoichiometric mixture of hydrogen gas and oxygen gas, through the electrolysis of water. The inventors herein have discovered that the core of an electrolytic HHO generator behaves like a diode; namely, the current through the core and hence the rate of HHO generation changes exponentially for a linear change in voltage applied to the core over a range of voltages. This discovery has profound implications for HHO generator design.

A. Achieving Low DC Resistance of the HHO Generator Consistent with High Mechanical Strength and Durability of the HHO Generator Because of the diode-like response of the cores of the HHO generator, a small reduction in resistance of the HHO generator circuit results in a large increase in HHO generation rates. If all other factors are equal, providing the lowest possible resistance of the HHO generator circuit provides the highest possible HHO generation efficiency. The problem of achieving low resistance is made more difficult by the corrosive nature of the liquid electrolyte within the HHO generator, by the need to seal the generator case against leakage of the electrolyte and of hydrogen gas under pressure, by the need to accommodate possible detonation of the HHO mixture within the generator case, and by the environmental conditions that exist in a motor vehicle or other application.

1. Construction of the Electrodes and Support Plates for Low DC Resistance

Good electrical conductors such as copper are not suitable for use within the electrolyte environment due to corrosion and poor mechanical strength. Stainless steel has good corrosion resistance and mechanical strength, but is not a good electrical conductor. Because stainless steel is a poor conductor, the cross sectional area of stainless steel conductors must be much larger than for a corresponding copper conductor to accommodate the high DC current flows through the generator. If the electrodes penetrating the case are composed of stainless steel, the large size of the stainless steel electrodes requires that the case penetrations also be large. Large penetrations of the case provide the opportunity for leakage of electrolyte or hydrogen through the case at the case perforations through which the electrodes pass.

The invention provides that the electrodes are composed of a material having relatively good conductivity, such as copper or brass, that pass through relatively small perforations through the case below the level of the electrolyte. Each electrode is in threaded engagement with a stainless steel support plate located inside the case. The leakage of electrolyte through the perforations, and contact between the electrolyte and the copper or brass electrode, is prevented by non-conductive bushings located on the inside of the case and compressed between the stainless steel support plate and the case. Tension applied to the electrode, as by a nut located on the outside of the case and electrically insulated from the case, compresses the non-conductive bushing between the stainless steel support plate and the case, clamping the support plate to the case and preventing leakage of electrolyte through the perforation. Sealing of the non-conductive bushing may be augmented by O-rings or gaskets disposed on either side of the non-conductive bushing. The non-conductive bushing is selected to be large enough so that the stainless steel support plate is securely supported within the case and securely attached to the case.

The relatively large stainless steel support plate provides a conductor having a large cross sectional area to accommodate high current flows through the electrode and through the generator. The stainless steel support plate also provides a robust platform to which to mount the cores of the HHO generator. Clamping the stainless steel support plate to the case as described above allows the support plate, and hence the core(s) that are attached to support plate, to resist vibration and other motion in the harsh environment of a motor vehicle application.

2. Construction of the Cores for Low DC Resistance

The stainless steel support plates support the cores within the case. Each core is composed of a first set and a second set of parallel stainless steel core plates. When the first and second set of core plates are placed in close proximity, immersed in electrolyte and DC electrical current passed through the core from the first set of core plates to the second set of core plates, water in the electrolyte dissociates into HHO.

If any of the first set of core plates touches any of the second set of core plates, the core will short circuit, stopping electrolysis and damaging the plates. If adjacent plates are too close and the voltage too high, arcing may occur with attendant loss of efficiency and possible detonation of HHO in the generator. If adjacent core plates are too far apart, the resistance is high, with attendant exponential reduction in HHO production and loss of efficiency. If the resistances any two locations on the adjacent plates are not equal, the areas with the least resistance will receive a disproportionate portion of the electricity flow, while other areas of the adjacent plates will be starved for electricity and will not efficiently generate HHO.

Each of the core plates is generally rectangular in shape. One corner of each core plate defines a hole sized to accommodate a stainless steel fastener, which may be a bolt. The opposing corner of each plate defines a clearance cut-out.

A first stainless steel bolt passes through the holes of the plates of the first set of core plates and secures the first set of core plates to a first stainless steel core connector. The core plates of the first set of core plates are held in a spaced apart relation along the length of the first bolt by stainless steel washers located on the first bolt and interposed between each of the core plates of the first set of core plates.

The second set of stainless steel core plates is a mirror image of the first set of core plates. A second stainless steel bolt secures the second set of core plates together and to a second core connector, just as for the first set of core plates. The core plates of the second set of core plates are maintained in a spaced apart relation by stainless steel washers, just as for the first set of core plates.

The first and second sets of core plates are arranged so that the core plates of the first set of core plates are located adjacent to or between the core plates of the second set of core plates. The first bolt and the second bolt appear on opposite corners of the assembled core. The clearance cutout of each plate prevents the plate from touching the washers of the opposing set of core plates, thus preventing short-circuiting at those locations.

The first and second core plates are secured together by non-conducting core plate connectors. The non-conducting core plate connectors may be rods, clips, pins, fibers, adhesives, or any other non-conducting fasteners known in the art. The non-conducting core plate connectors may be rods that pass through connecting holes defined by the first and second sets of core plates. Non-conducting spacers that are interposed between each adjacent pair of core plates and around the non-conducting fastener define the separation distance between each adjacent pair of plates. The separation distance is selected for optimal HHO generation between the plates when the core is immersed in electrolyte and DC current passes through the core. This generally requires that the distance be selected to be as close as possible consistent with absence of arcing between adjacent plates.

Using bolts and washers to connect the first set of core plates together and to connect the second set of core plates together allows robust, stainless steel connectors providing a large cross-sectional conducting area consistent with high mechanical strength and low resistance. Use of the first and second bolts connected to core connectors also allows each core to be connected, both mechanically and electrically, to a support plate or to other cores operated in series. Using this mounting apparatus, an unlimited number of cores may be connected each to the next in series.

Use of the bolts in opposite corners of each set of plates provides for electrical flow paths of nearly equal length and hence nearly equal resistance for each location on each pair of adjacent plates in a core. This provides for a balanced resistance for every electrical flow path and for even generation of HHO on each location of adjacent plates. Balanced resistance through the cores prevents local areas of low resistance that starve other areas of the plates of electrical power. The use of non-conductive fasteners and spacers assures separation between plates, avoiding arcing and the attendant problems of combustion of HHO in the generator caused by the spark. Use of the non-conductive fasteners and spacers also allows local resistance between adjacent plates to be further adjusted by selecting the thickness of spacers.

B. Preventing Overheating of the HHO Generator

The Invention solves the problem of overheating and boiling of the electrolyte and the resulting failure of the generator by limiting the electrical current flow through the generator. As noted, very high DC current flow (in the range of 100 amps) is required for adequate hydrogen production. As the temperature of the electrolyte increases, the DC resistance of the electrolyte drops. For a prior art HHO generator operating in the optimal voltage range, reduction in DC resistance causes an exponential increase in the current flow, which causes further heating of the electrolyte and a further drop in DC resistance. The result is a runaway temperature increase of the electrolyte, boiling of the electrolyte, contamination of the produced HHO by steam, and failure of the prior art hydrogen generator.

The invention controls the current flow and hence the overheating of the generator and electrolyte by either of two mechanisms. First, the electrical power supply to the HHO generator may a constant current DC power supply using any technology known in the art, such as an inductive switching power supply or a power supply having an active control system. In the case of the constant current power supply having an active control system, a sensor detects DC current flowing through the generator circuit. When the sensor determines that DC current flow through the generator exceeds a predetermined maximum, the control system reduces the voltage supplied to the HHO generator by the DC power supply, reducing the resulting current flow. The temperature of the electrolyte thus cannot spiral upward and the operation of the generator is protected.

The second mechanism by which the flow of current through the generator can be limited is through use of a constant voltage power supply, such as that found on conventional motor vehicles, combined with a ballast resistor in series with the generator, where the ballast resistor has a low resistance (in the range of 0.200 to 0.010 ohms). Because the resistor is in series with the HHO generator, all current flowing through the generator also flows through the ballast resistor. For a constant voltage DC power supply, the increase in current through the ballast resistor causes an increased voltage drop across the ballast resistor, which leaves less voltage for the HHO generator. Because of the diode-like response of the cores, the drop in voltage across the cores caused by the ballast resistor causes an exponential drop in the current flowing through the cores, allowing the cores to cool and preventing failure of the HHO generator. The interaction of the cores and the ballast resistor is a negative feedback relation that passively limits current flow and prevents overheating of the HHO generator.

An air-cooled stainless steel bar located outside of the case and acting as the ballast resistor has proven satisfactory in practice. Providing multiple attachment points to the stainless steel bar allows resistance of the ballast resistor and hence the HHO output of the HHO generator to be matched to the capabilities of the DC power supply powering the HHO generator.

C. Controlling the Amount of HHO Generated Consistent with Efficient HHO Generation For efficient HHO generation, the DC voltage across the generator cores must fall within a narrow range due to the diode-like electrical response of the cores. If the core voltage falls outside that range, the efficiency of HHO generation falls off rapidly.

To achieve efficient HHO generation, the generator is equipped with an on/off control system. When the generator is 'on,' a high current is flowing through the cores and the cores are generating HHO efficiently. When the generator is 'off,' no electricity is flowing through the cores and the cores do not generate HHO. The control system includes a sensor to detect the amount of HHO required for the application. For a motor vehicle application, the sensor may detect engine throttle position, a commanded fuel injector position, engine speed, or any other parameter appropriate to determine the quantity of HHO required for proper operation of the motor vehicle engine. For a non-engine application such as a source of fuel for a torch, the sensor may detect pressure of the HHO in the headspace of the case and turn the generator 'off' when the pressure reaches a first pre-determined value and turning the generator 'on' when the pressure drops below a second pre-determined value.

The 'on' and 'off' switching is accomplished by the use of variable resistors in the HHO generator circuit. Raising the impedance of the variable resistor shuts the HHO generator 'off.' Lowering the impedance of the variable resistor turns the HHO generator 'on.' The variable resistors are controlled by a controller.

The head space of the case acts to temporarily store HHO generated by the cores, holding HHO under pressure until it is needed and smoothing the flow of HHO from the case. A flow constrictor limits the rate of HHO flow from the headspace of the case, maintaining pressure within the case during the time that the HHO generator is 'off.'

D. Controlling 'Inductive Kick'

'Inductive kick' is the tendency of the voltage to spike after a circuit is abruptly opened due to induction from the wires and components of the circuit. 'Inductive kick' can cause arcing across the gap between adjacent plates in the core of the HHO generator or between the plates and the case. Arcing can cause combustion of the HHO within the case.

To prevent the effects of 'inductive kick,' the current through the cores is ramped down when the control system turns the cores to 'off.' Ramping is achieved by use of variable resistors in the HHO generator circuit, such as n-MOSFETS driven by a control voltage ramp circuit.

E. Preventing Leakage of Electrical Power to the Case

Leakage of electrical power between the support plates or core connectors or plates and the case results in a loss of power and efficiency of the HHO generator. The Invention utilizes non-conducting plates that are interposed between the cores and the case and between adjacent cores. Production of HHO within the cores causes vigorous circulation of electrolyte upward through the center of the cores and downward around the outside of the cores. The non-conducting plates are located to allow that vigorous circulation so as to avoid starving the plates of electrolyte from HHO bubble formation. Plastic plates interposed between the cores and the case and between adjacent cores have proved suitable in practice.

F. Preventing Leakage of Hydrogen Gas

Hydrogen gas has a very low viscosity and can pass through conventional gaskets and sealants. To prevent leakage of the HHO, the perforations of the case are located below the elevation of the surface of the liquid electrolyte. The perforations of the case therefore are submerged and are sealed against leakage of hydrogen gas by the liquid electrolyte. As examples, the perforations for the electrodes, any access panels and the termination of the fill tube all are located below the surface of the liquid electrolyte.

G. Effective Stripping of HHO Bubbles from the Electrodes

If a bubble of HHO grows on the surface of a core plate, but does not separate from that surface, the location on the core plate in contact with the bubble is not in contact with the electrolyte and is not available to generate more HHO. The Inventors have discovered that increasing the surface area of a plate by texturing the surface of the plate both increases the area for the formation of HHO bubbles and also reduces the tendency of the HHO bubble to adhere to the surface. Texturing of the core plate surface by sanding the surface so that the scratches caused by the sanding process are vertical (and hence parallel to the direction of HHO flow through the electrolyte), improves both HHO bubble formation and release by the bubble from the surface of the plate.

V. BRIEF DESCRIPTION OF THE DRAWINGS

Figure 2:
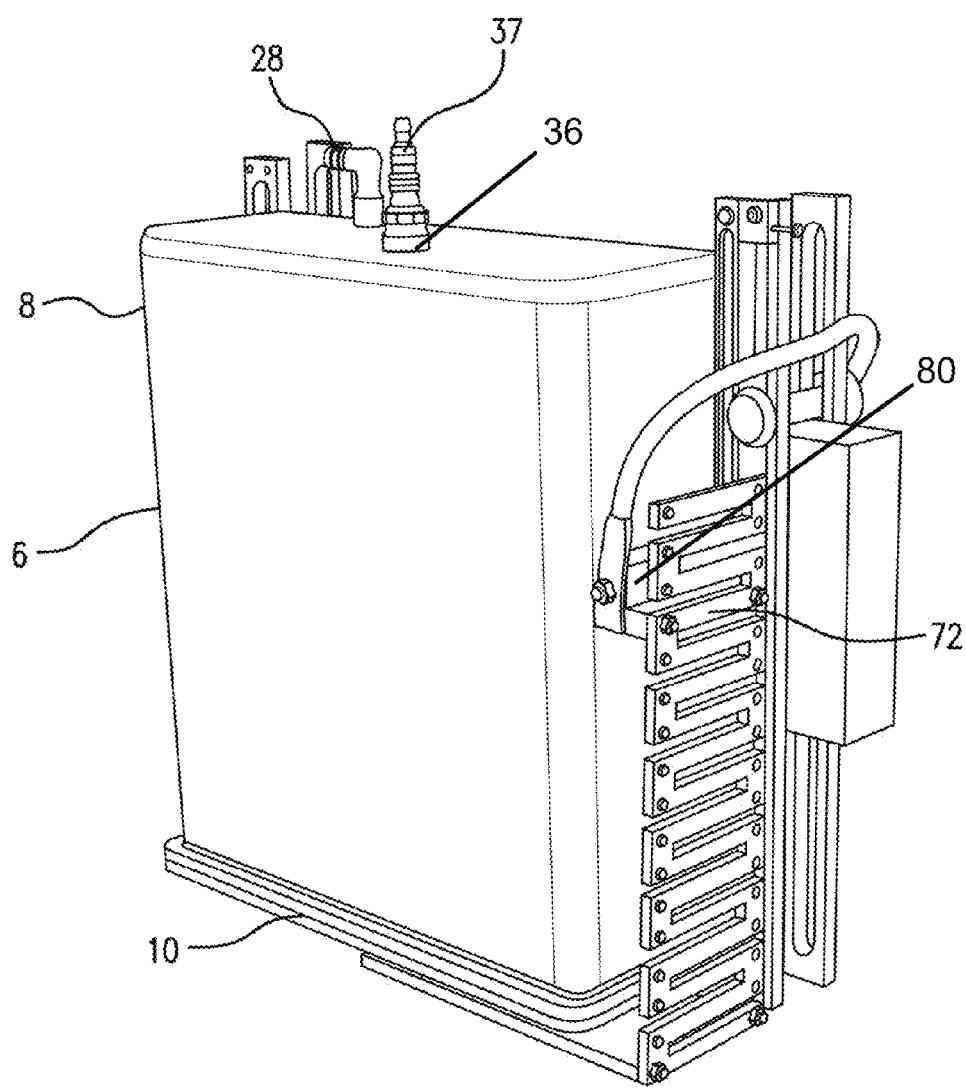
Figure 3:
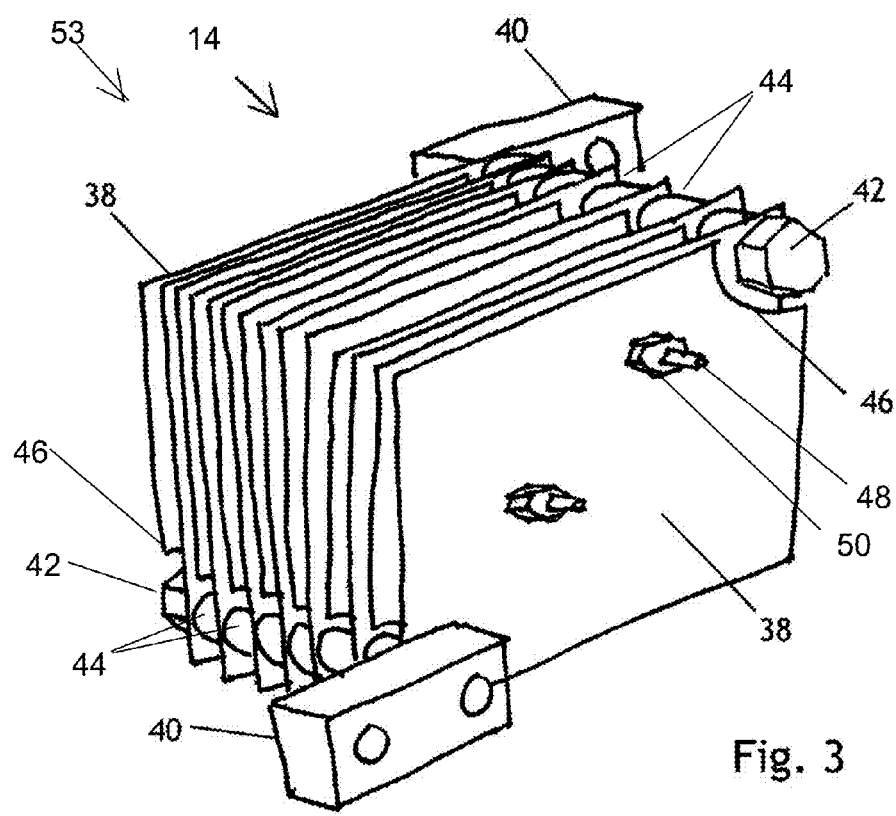
Figure 4:
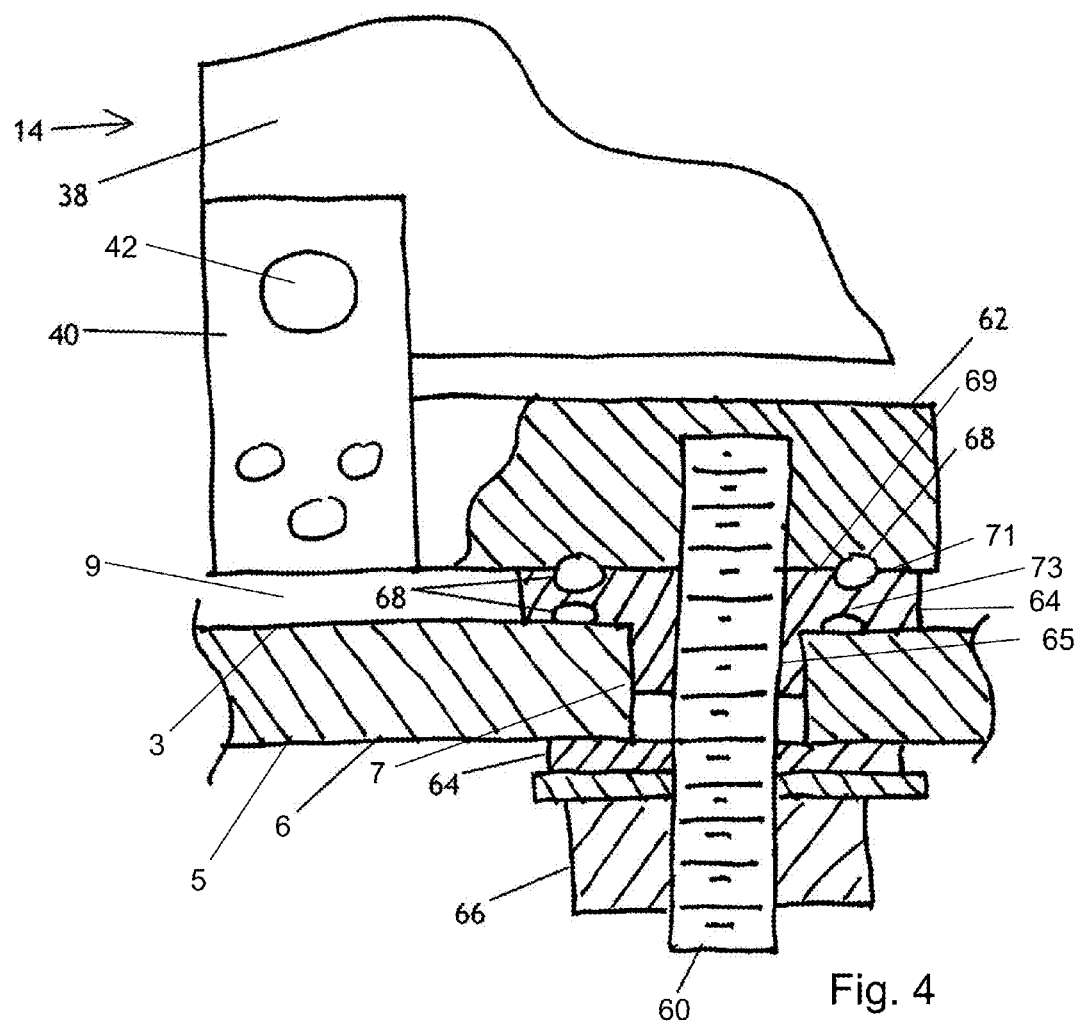
Figure 5:
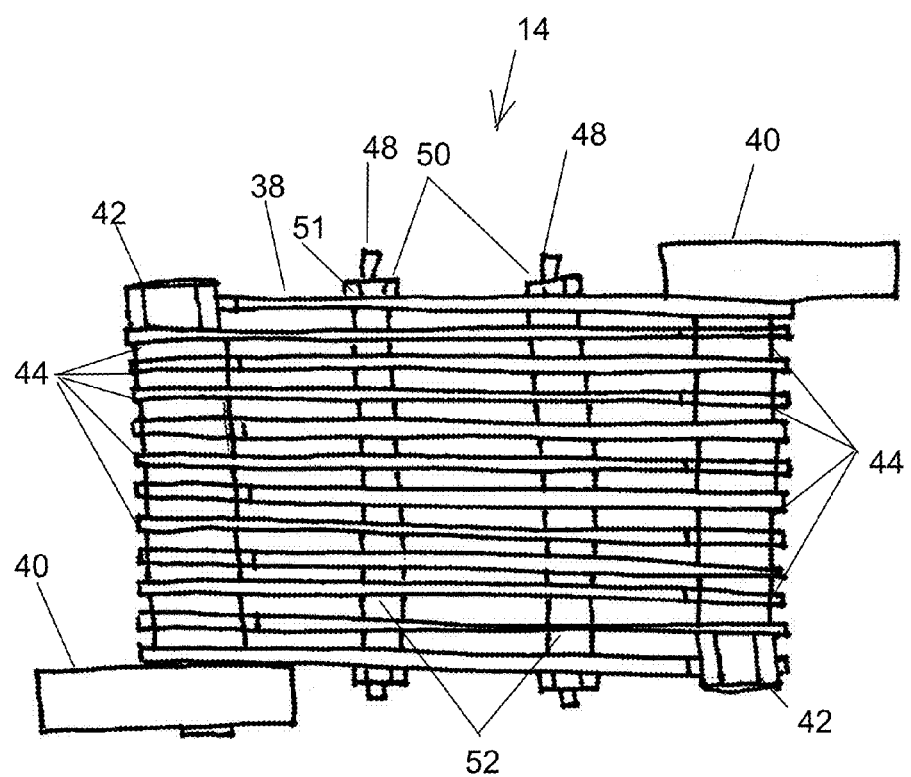
Figure 6A:
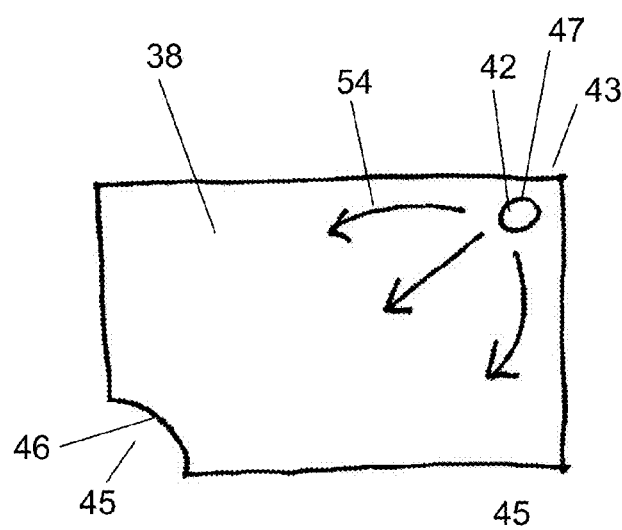
Figure 6B:
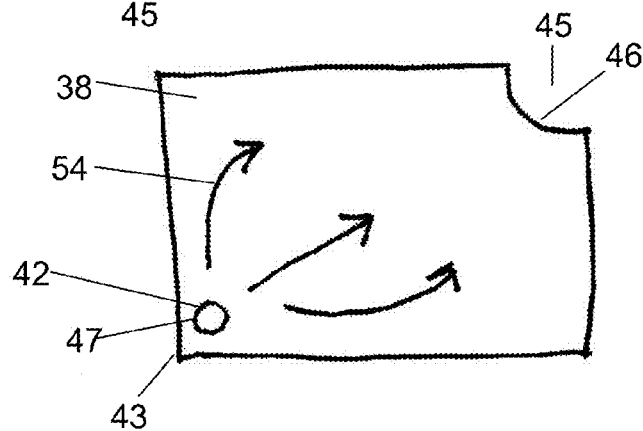
Figure 7:
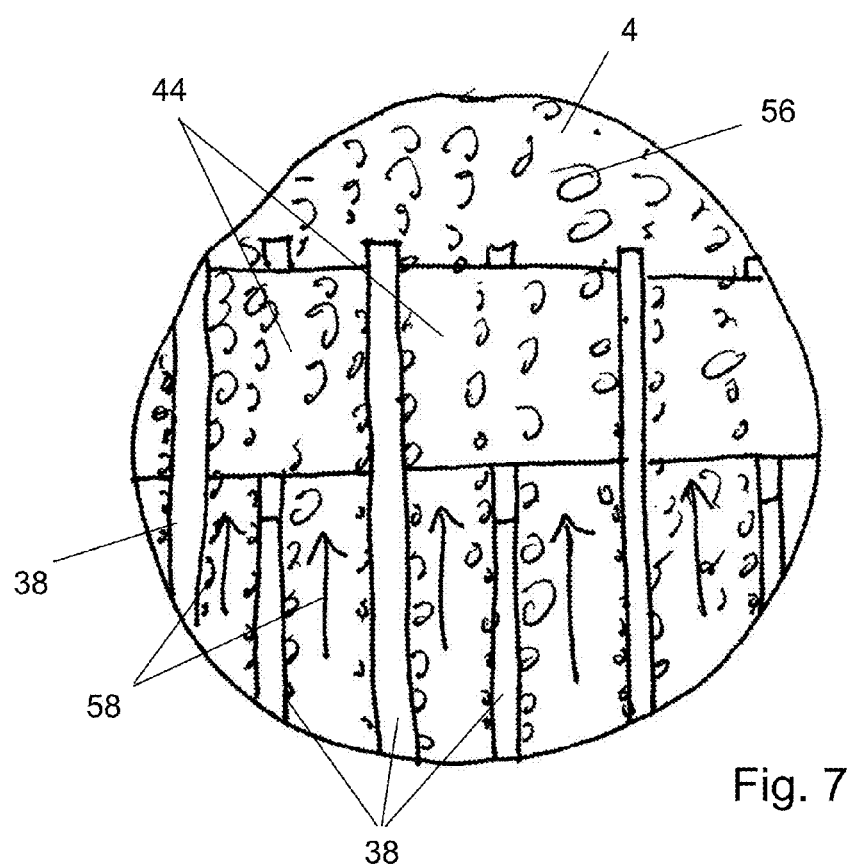
Figure 8:
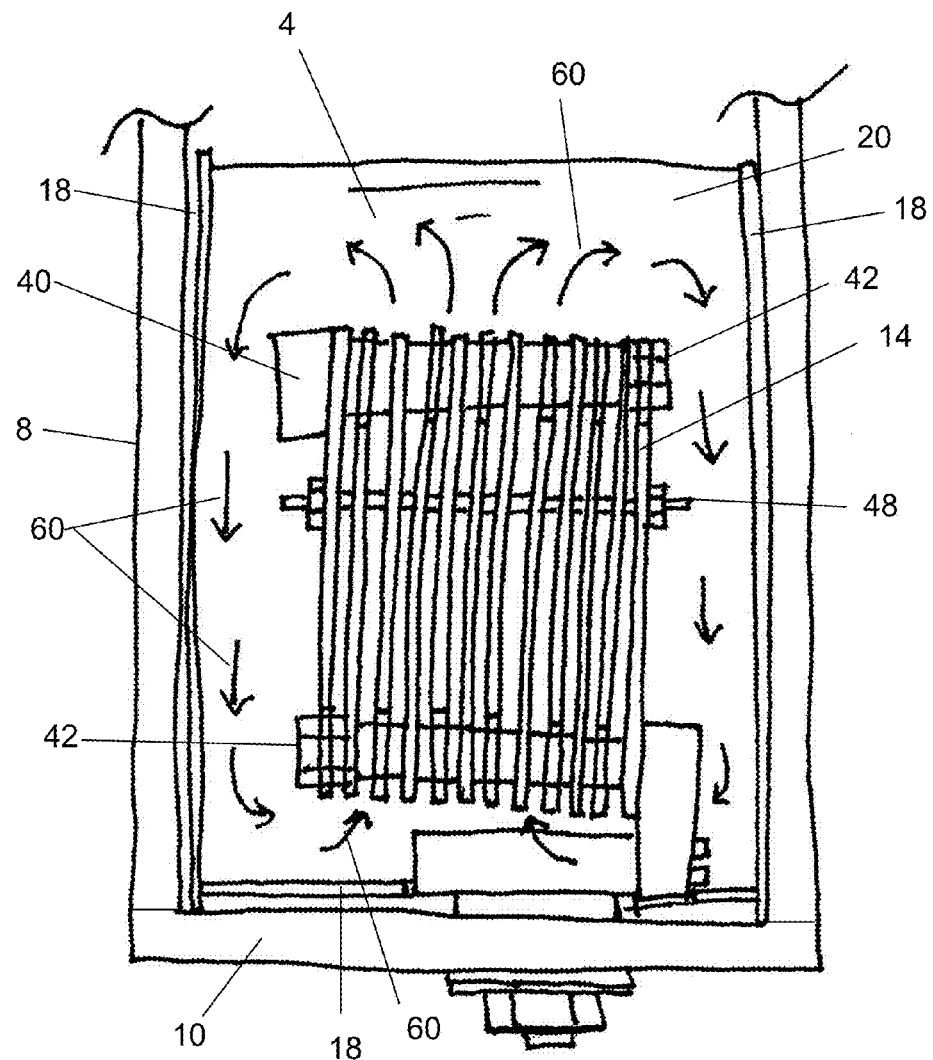
Figure 9:
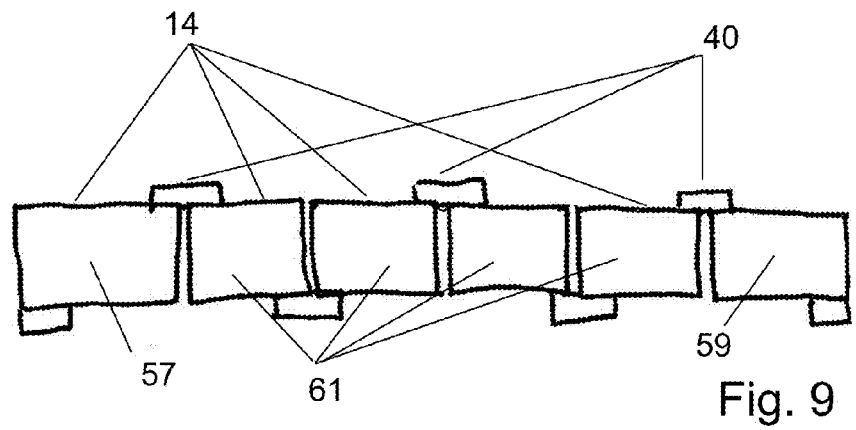
Figure 10:
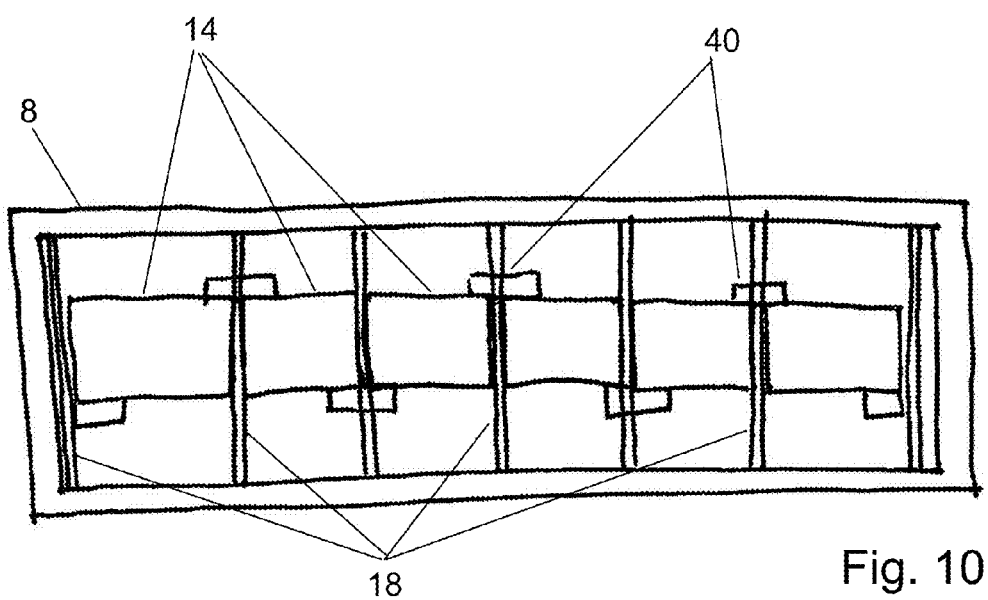
Figure 11:
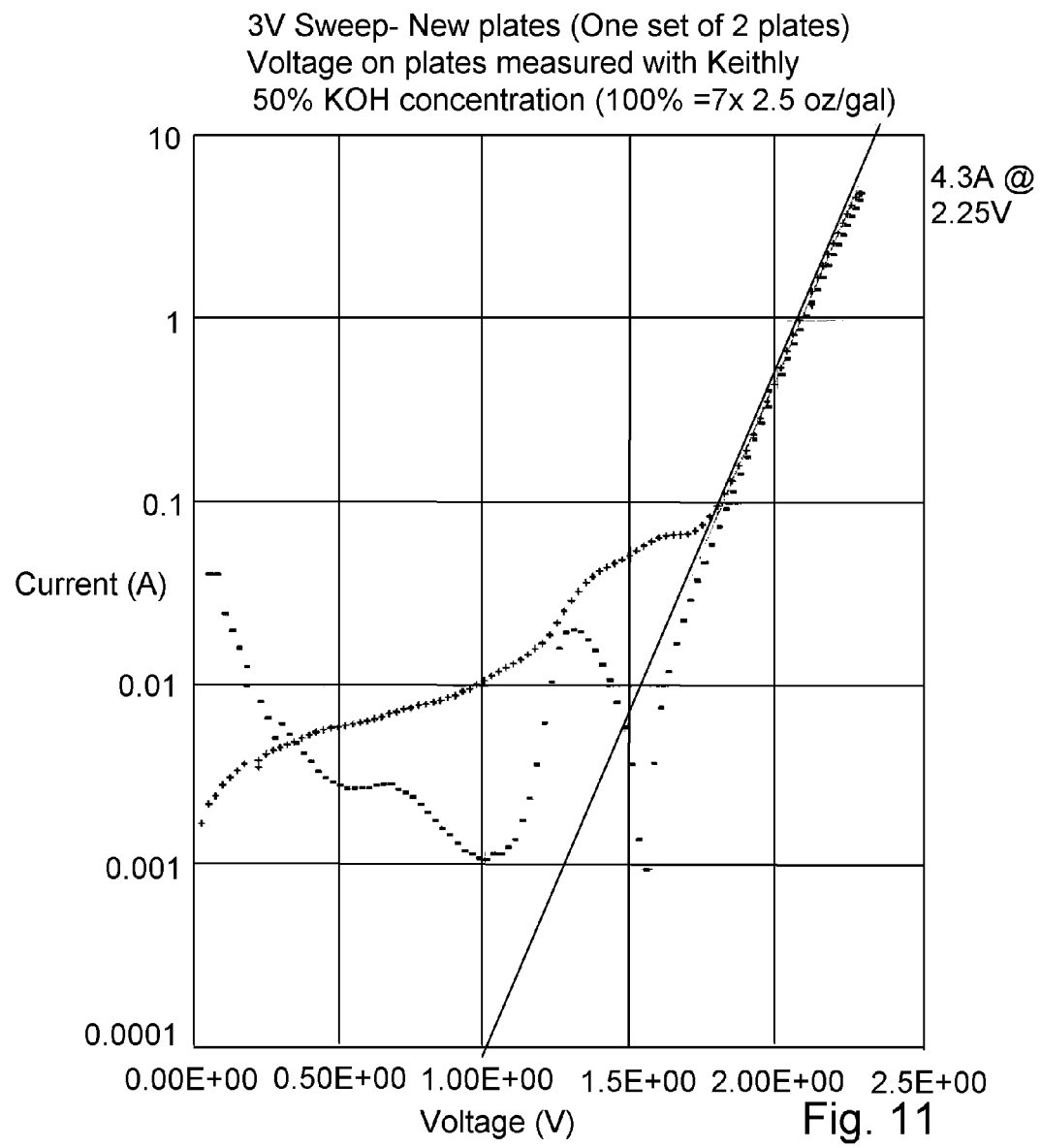
Figure 12:
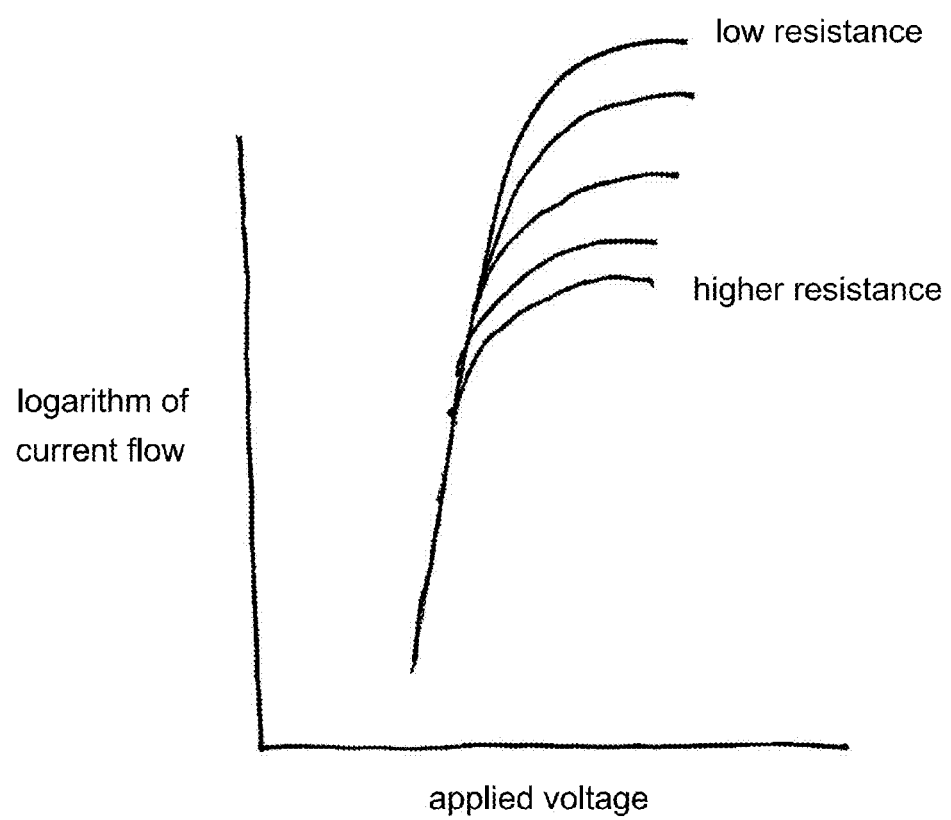
Figure 13:
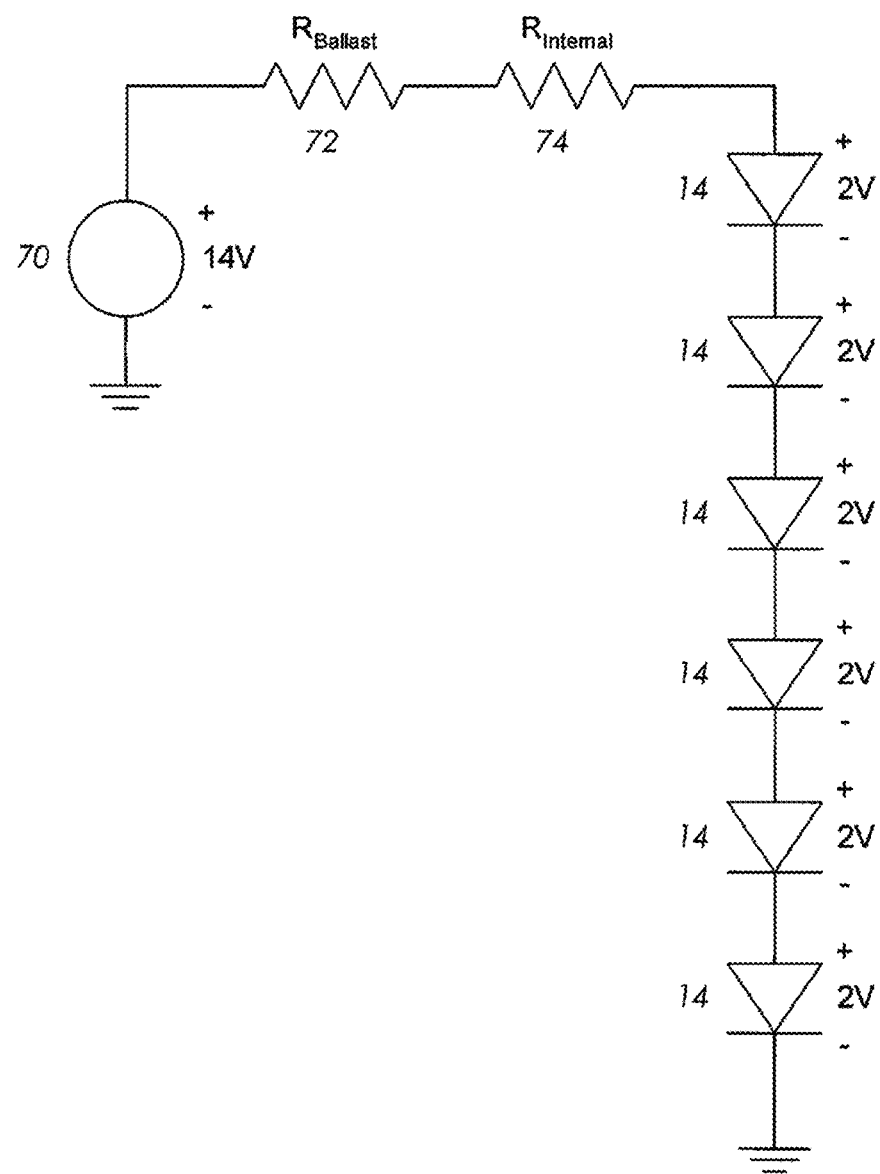
Figure 14:
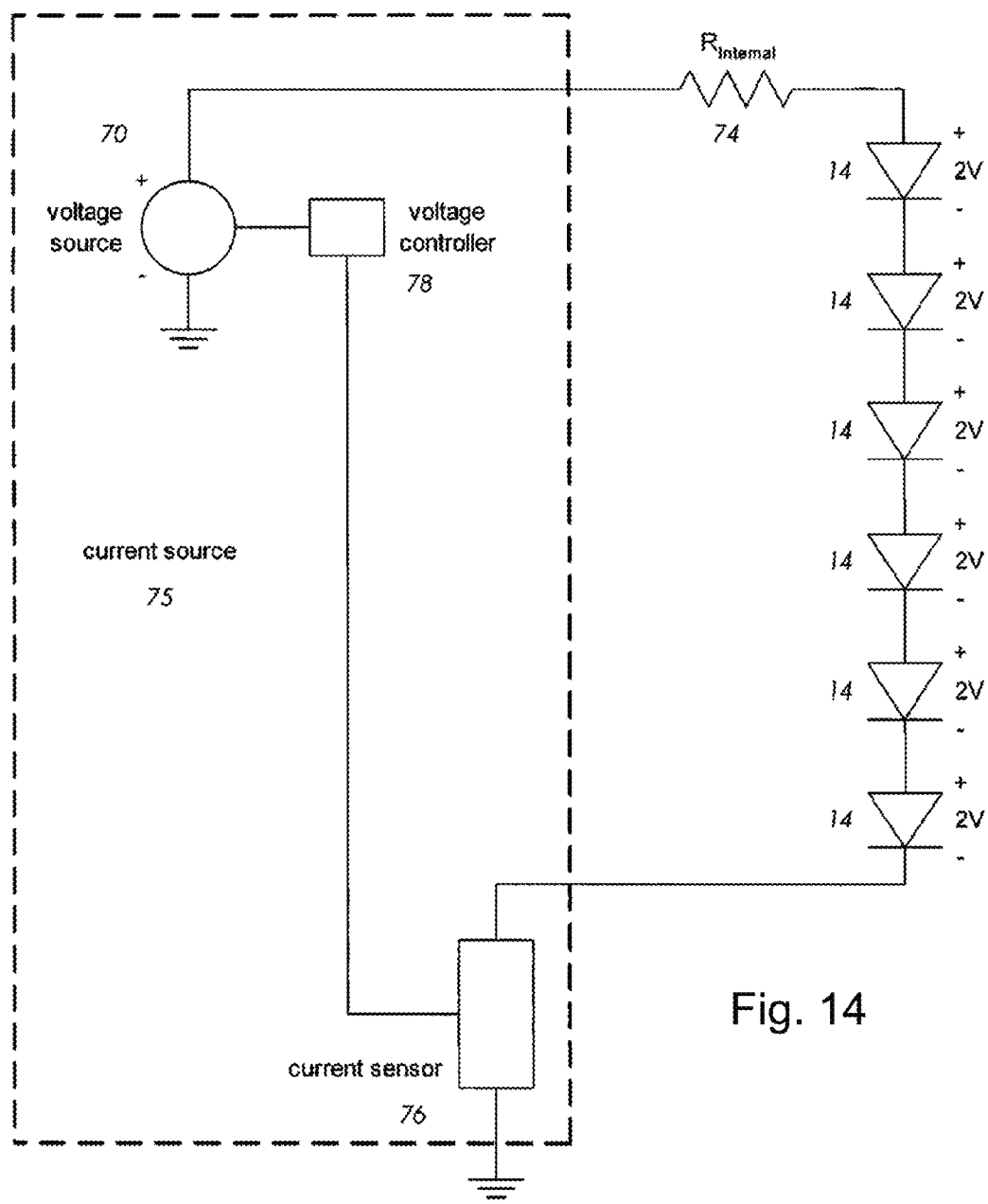
Figure 15:
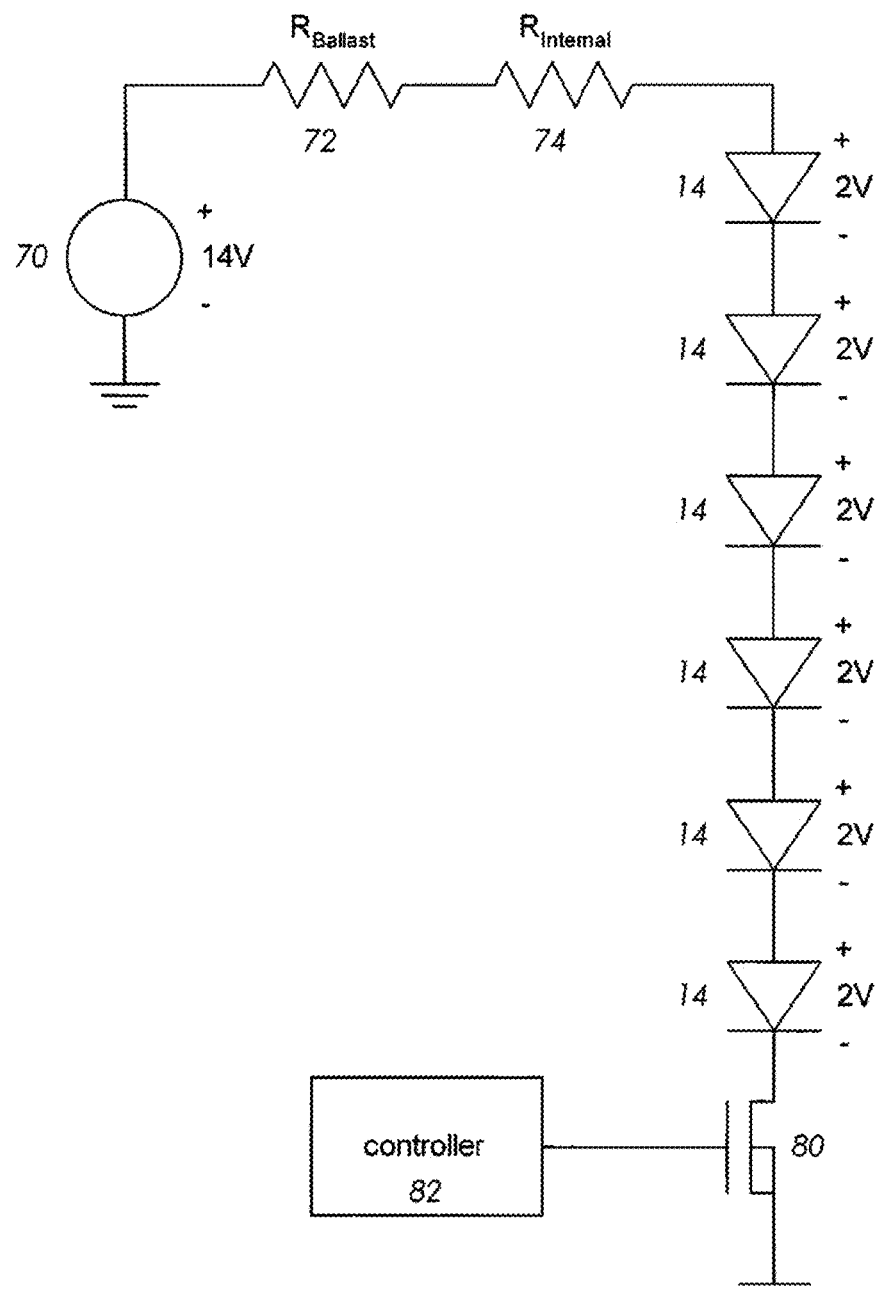
Figure 16:
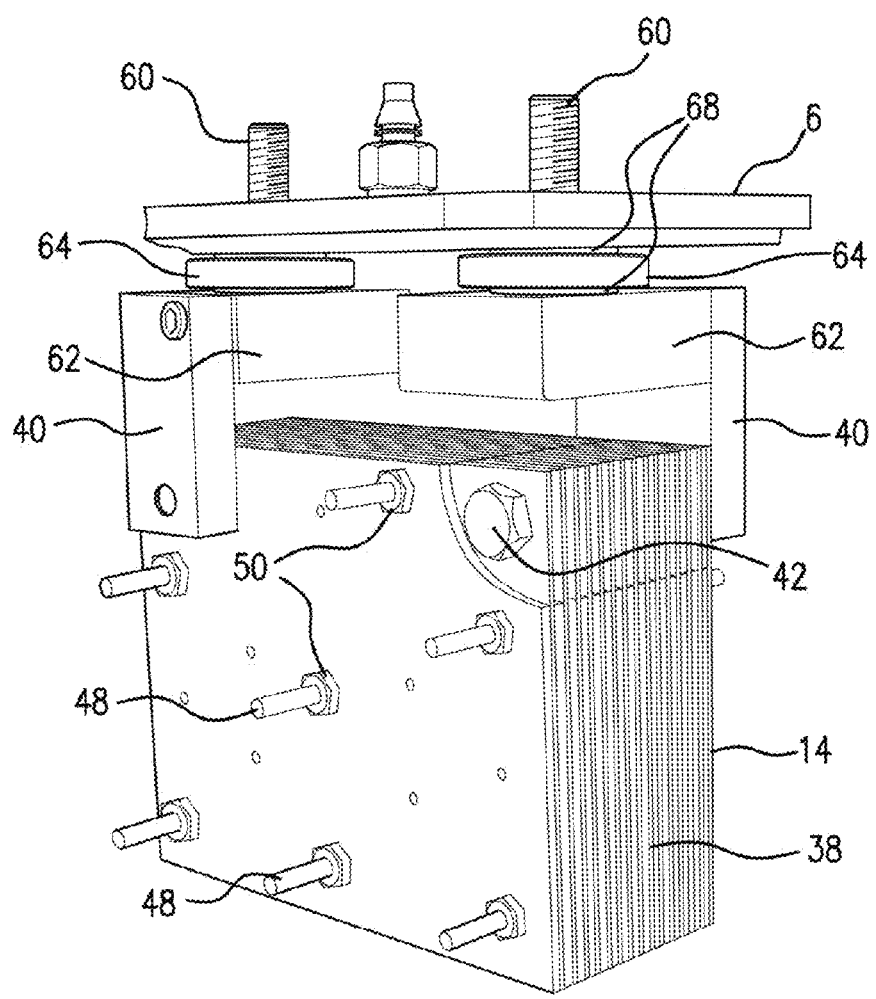
Figure 17:
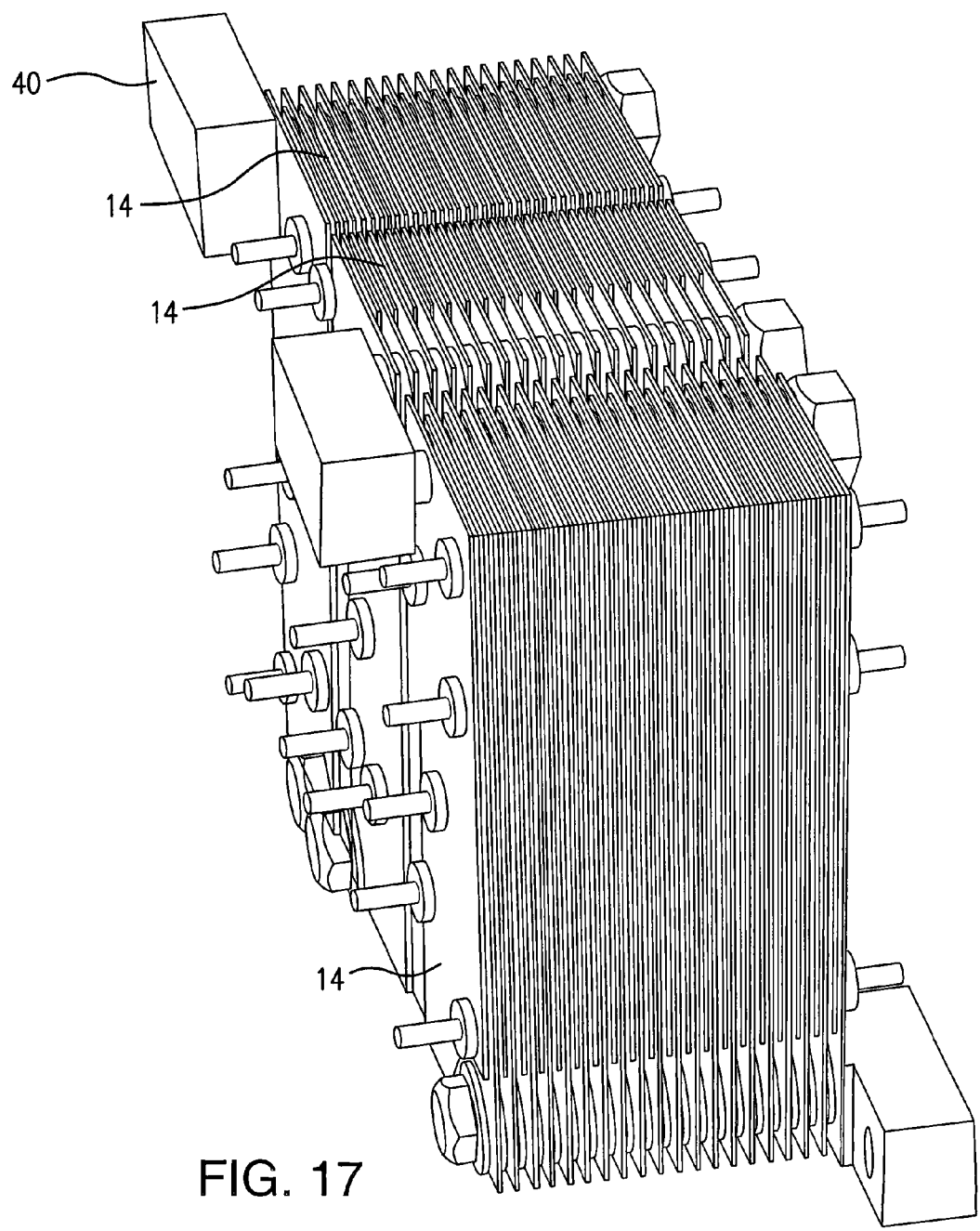
Figure 18:
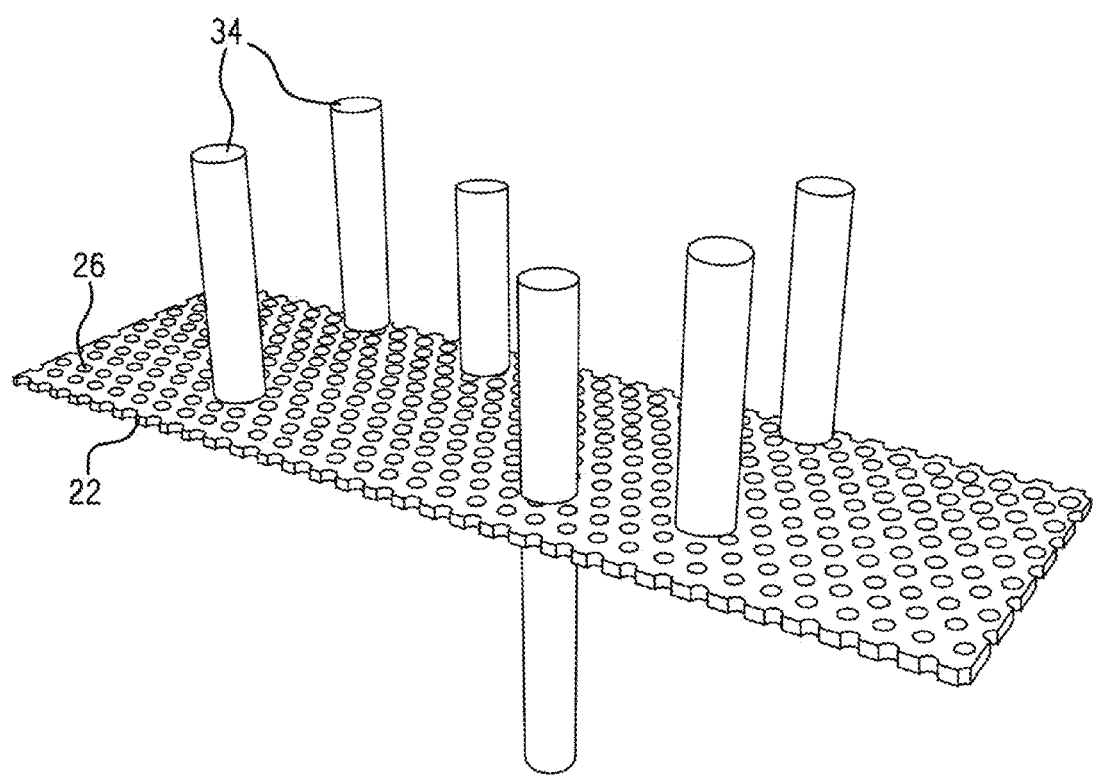
Figure 19:
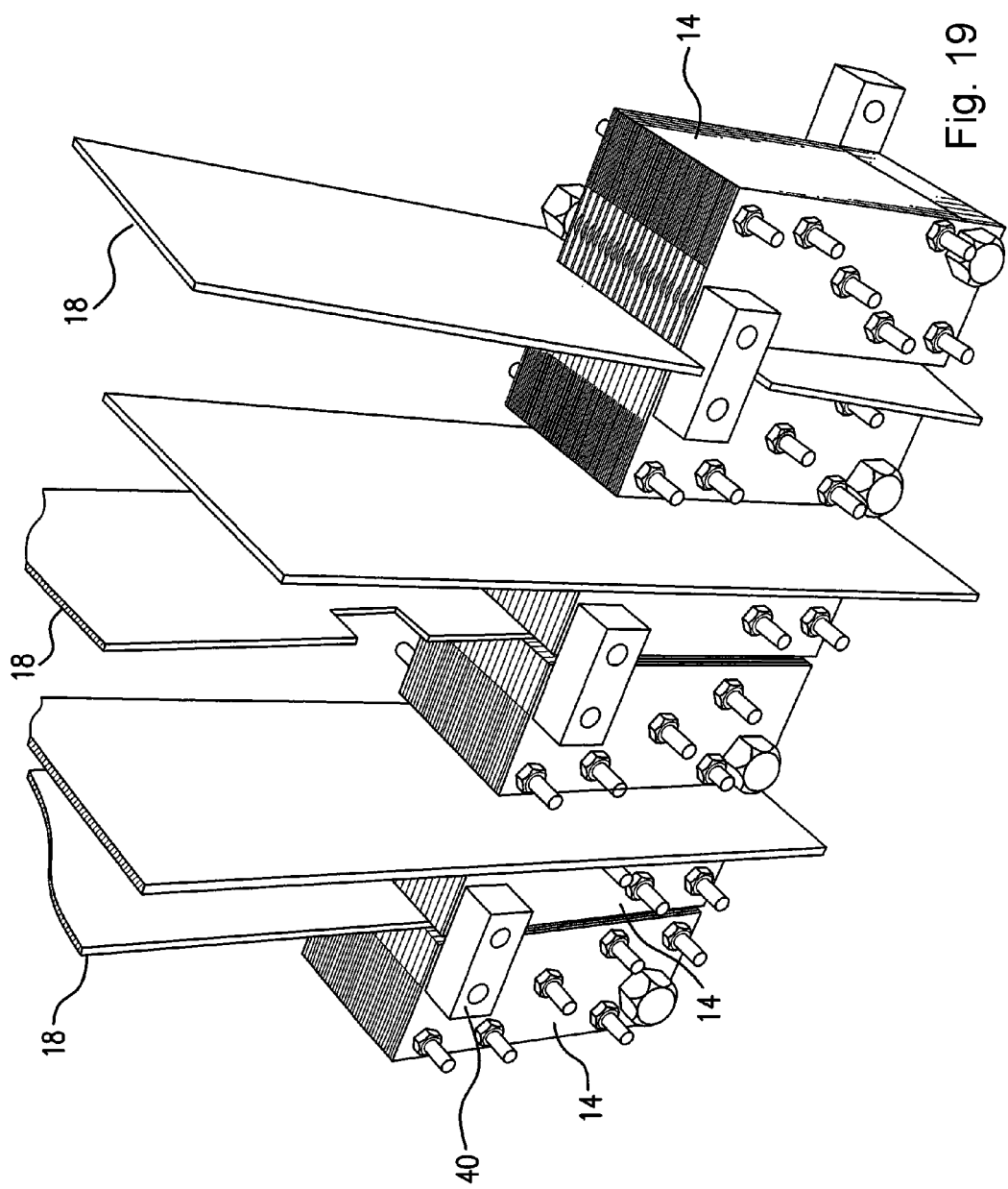
Figures 20, 20A, 20B:
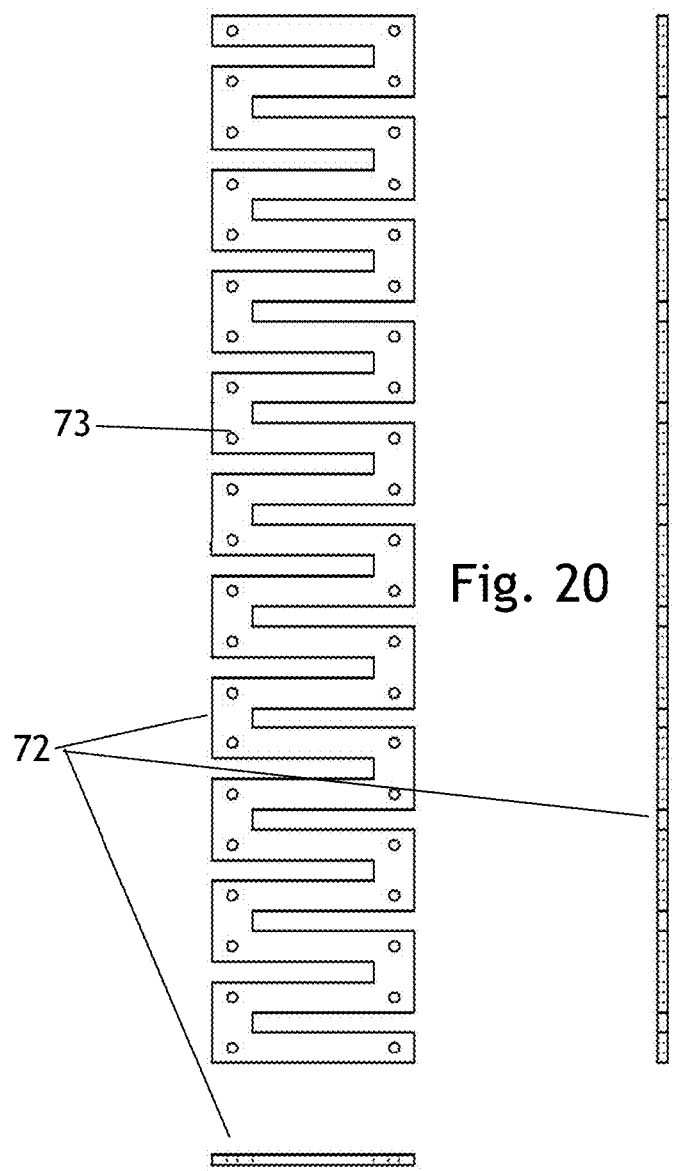
Figure 21:
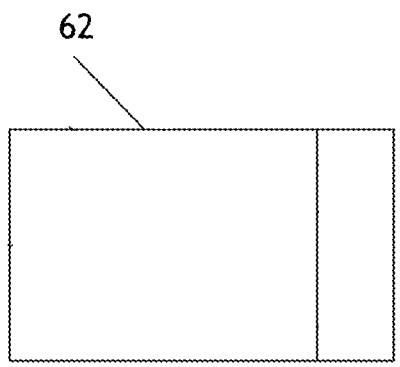
Figure 21B:
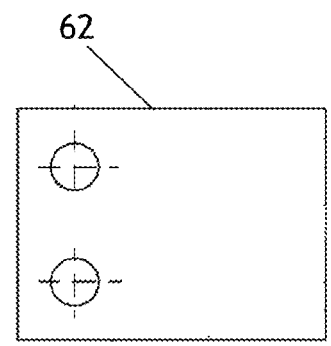
Figure 21A:
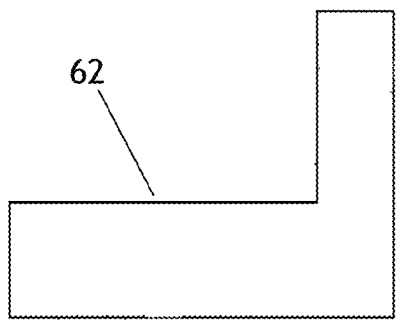
Figure 22:
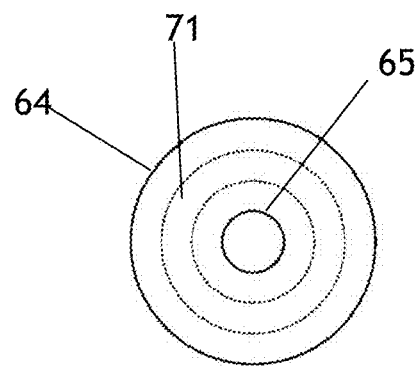
Figure 22A:
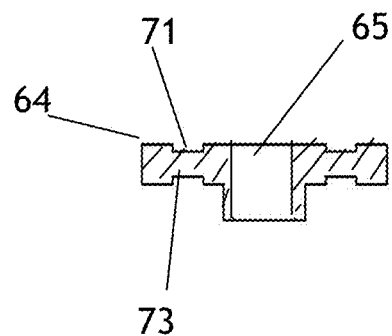
Figure 23:
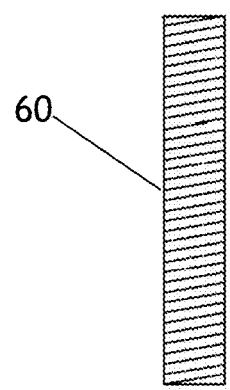
Figure 23A:
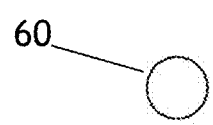
Figure 24:
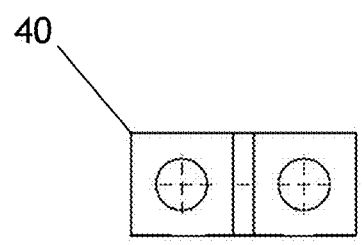
Figure 24A:
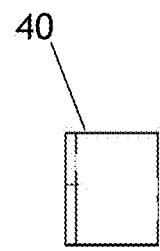
Figure 24B:
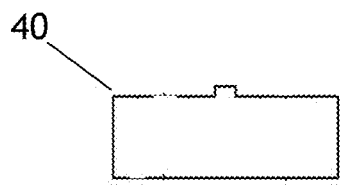
Figures 25, 25A, 25B:
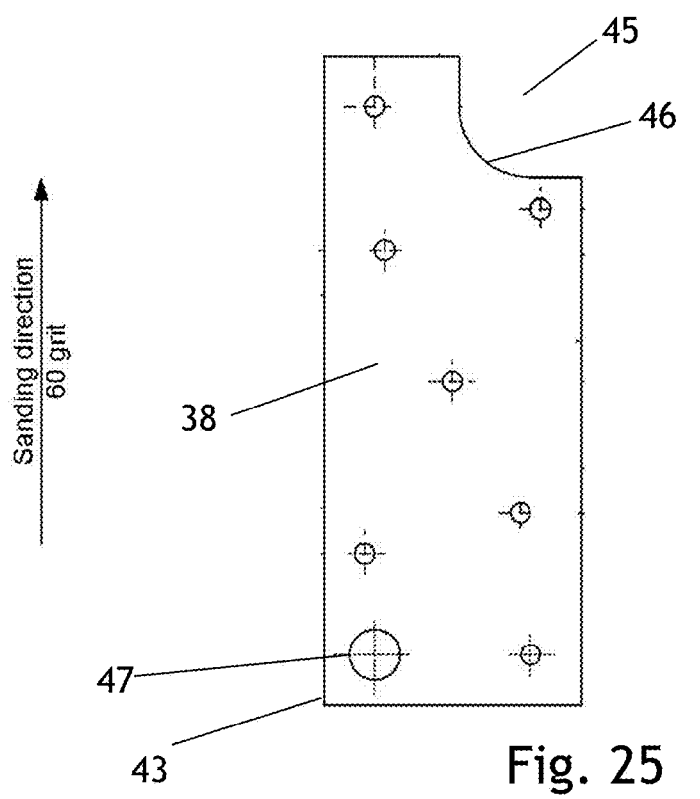

FIG. 1 is a section view of an HHO generator.
FIG. 2 is a photograph of the HHO generator.
FIG. 3 is a perspective view of a core.
FIG. 4 is a cutaway detail of the electrode and core mounting.
FIG. 5 is top view of a core.
FIGS. 6a and 6b are views of a pair of adjacent plates of a core.
FIG. 7 is a detail of a core in operation.
FIG. 8 is a side view of a core in operation.
FIG. 9 is a top view of six cores in series.
FIG. 10 is a top view of six cores in the casing.
FIG. 11 is a graph of current (logarithmic) versus voltage (linear) as actually measured for a core.
FIG. 12 is a schematic representation of the graph of FIG. 11 for different resistances.
FIG. 13 is a schematic circuit diagram of the apparatus utilizing a ballast resistor.
FIG. 14 is a schematic circuit diagram of the apparatus utilizing a source of constant current.
FIG. 15 is a schematic circuit diagram of the apparatus and a control system.
FIG. 16 is photograph of a core of a prototype.
FIG. 17 is photograph of core connected in series.
FIG. 18 is a photograph of the electrolyte separator.
FIG. 19 is a photograph of the six cores connected in series with the insulating panels.
FIGS. 20, 20a and 20b are top, side and end views of the ballast resistor.
FIGS. 21, 21a and 21b are top, side and end views of the support plate.
FIGS. 22 and 22a are top and side views of the non-conducting bushing.
FIGS. 23 and 23a are views of the electrode.
FIGS. 24, 24a and 24b are front, side and end views of the plate connectors that join the cores in series.
FIGS. 25, 25a and 25b are front, side and end views of the ⅓ size plate.

Figures 26, 26A:
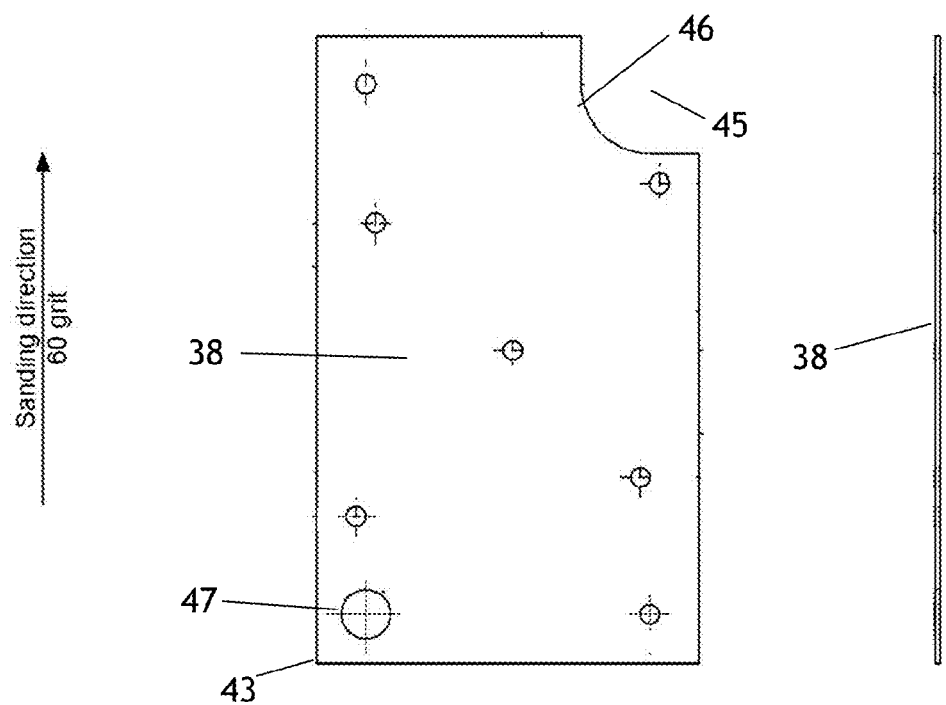
Figures 27, 27A, 27B:
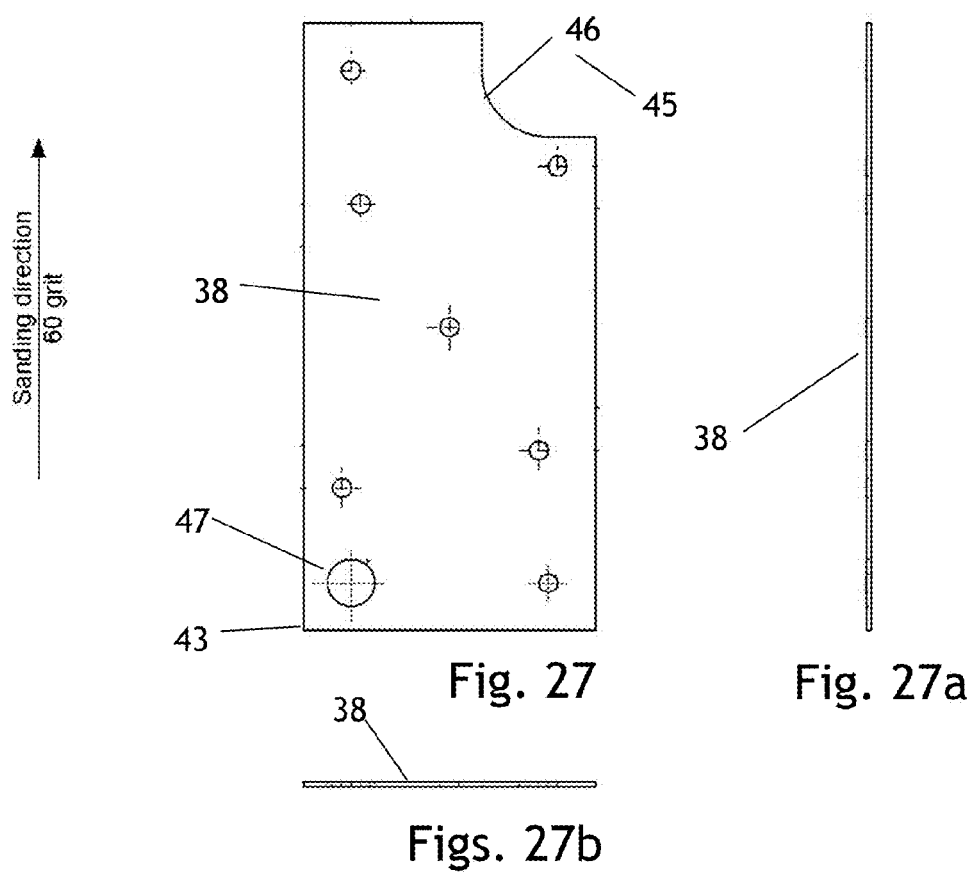
Figure 28:
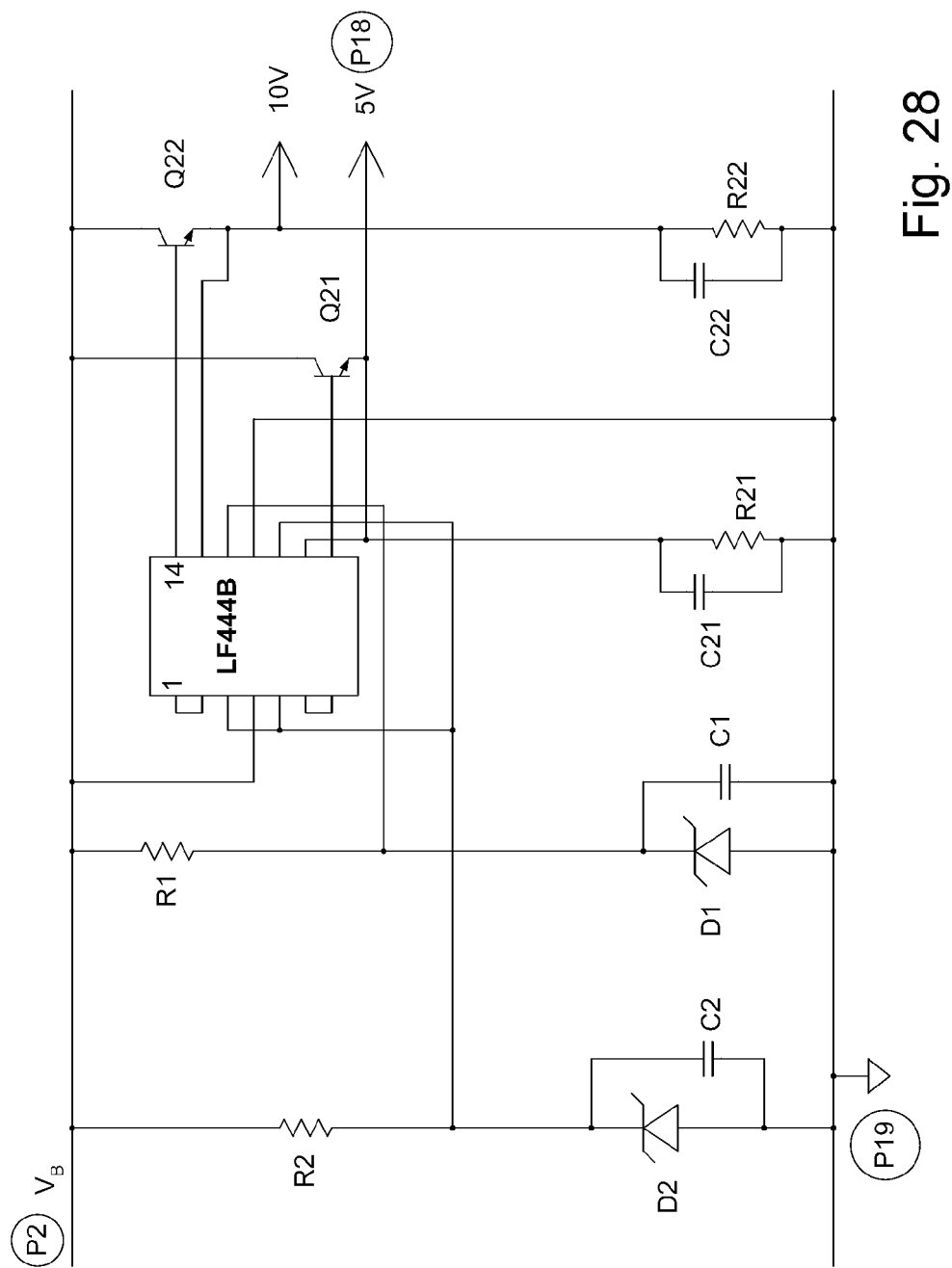
Figure 29:
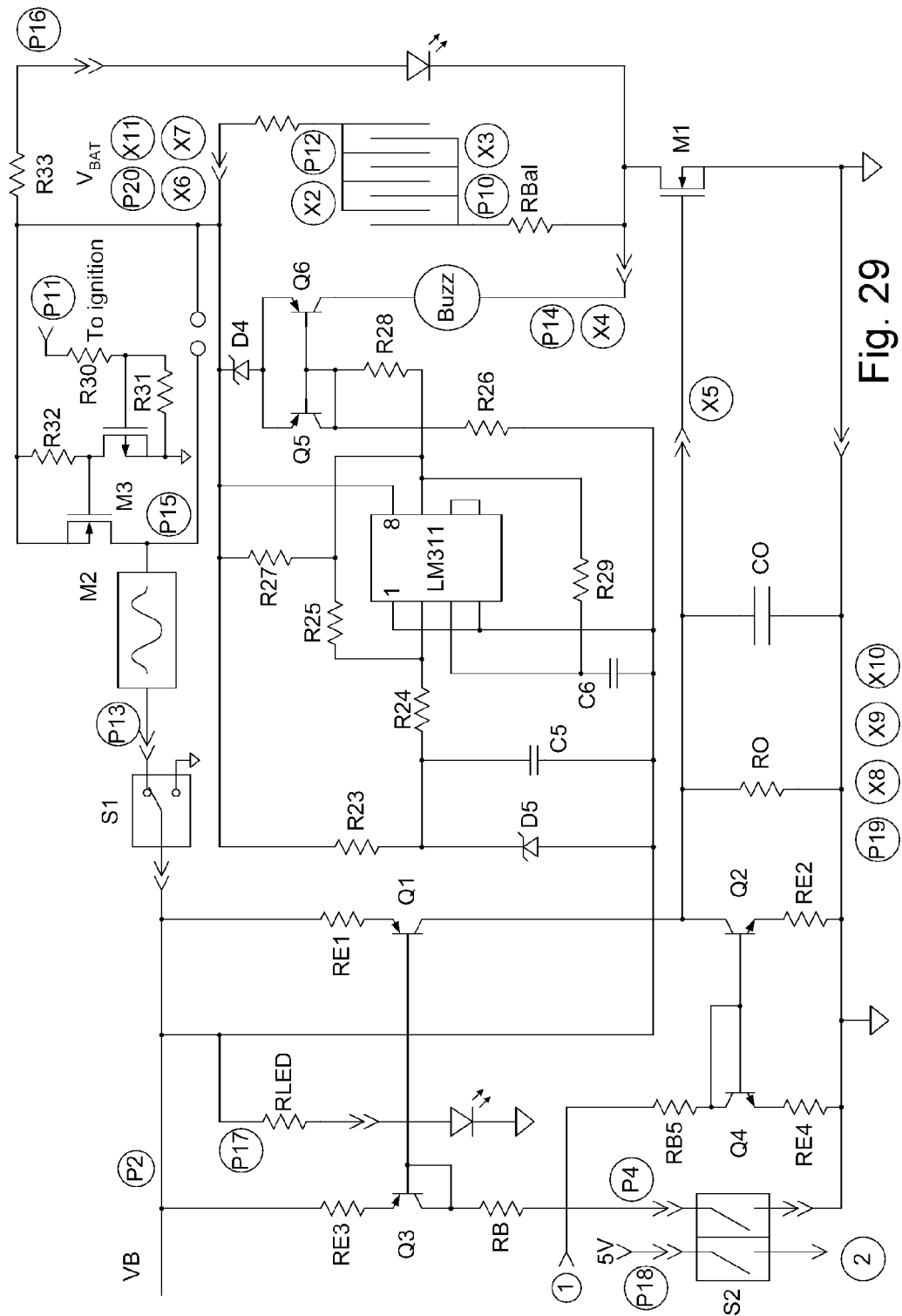
Figure 30:
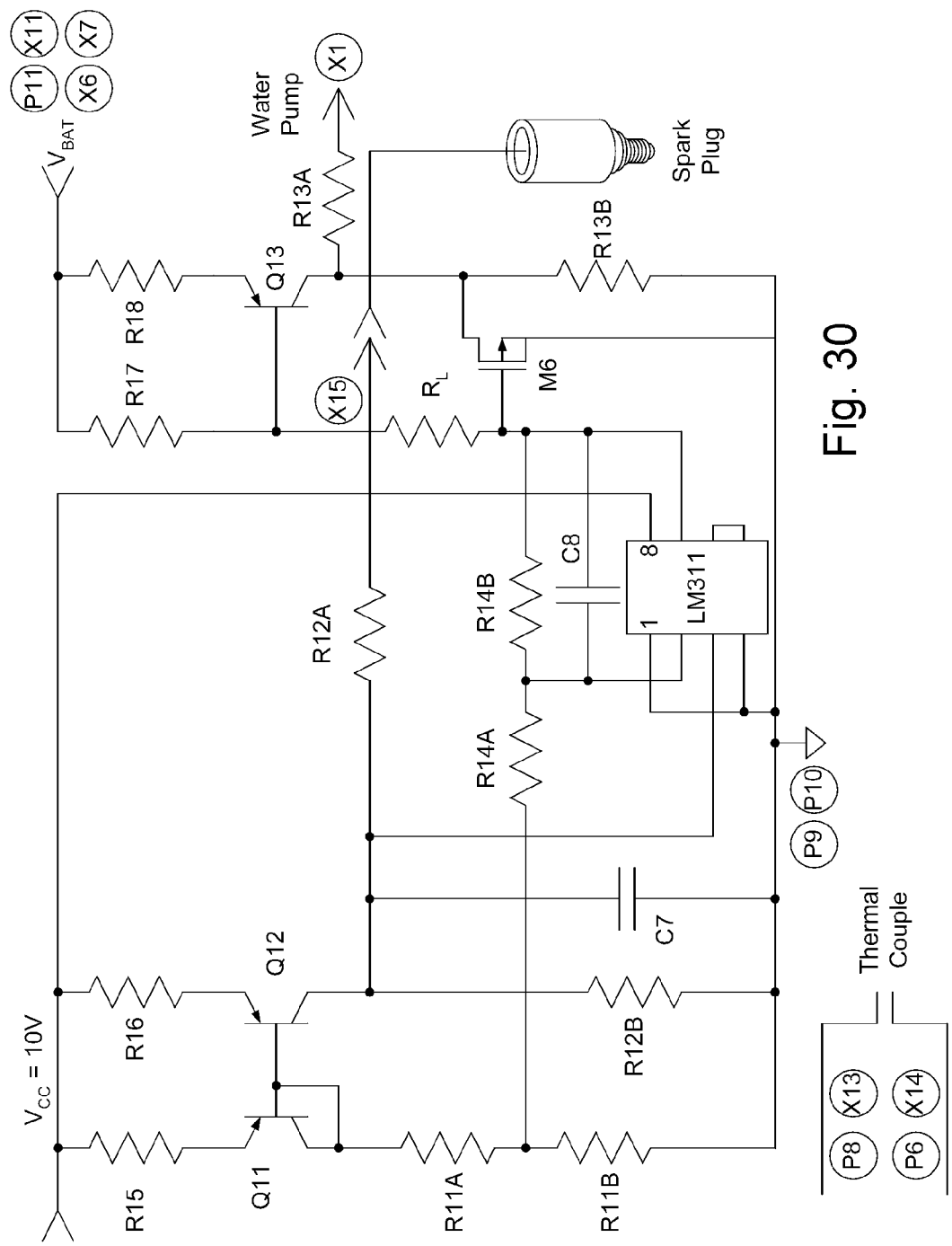
Figure 31:
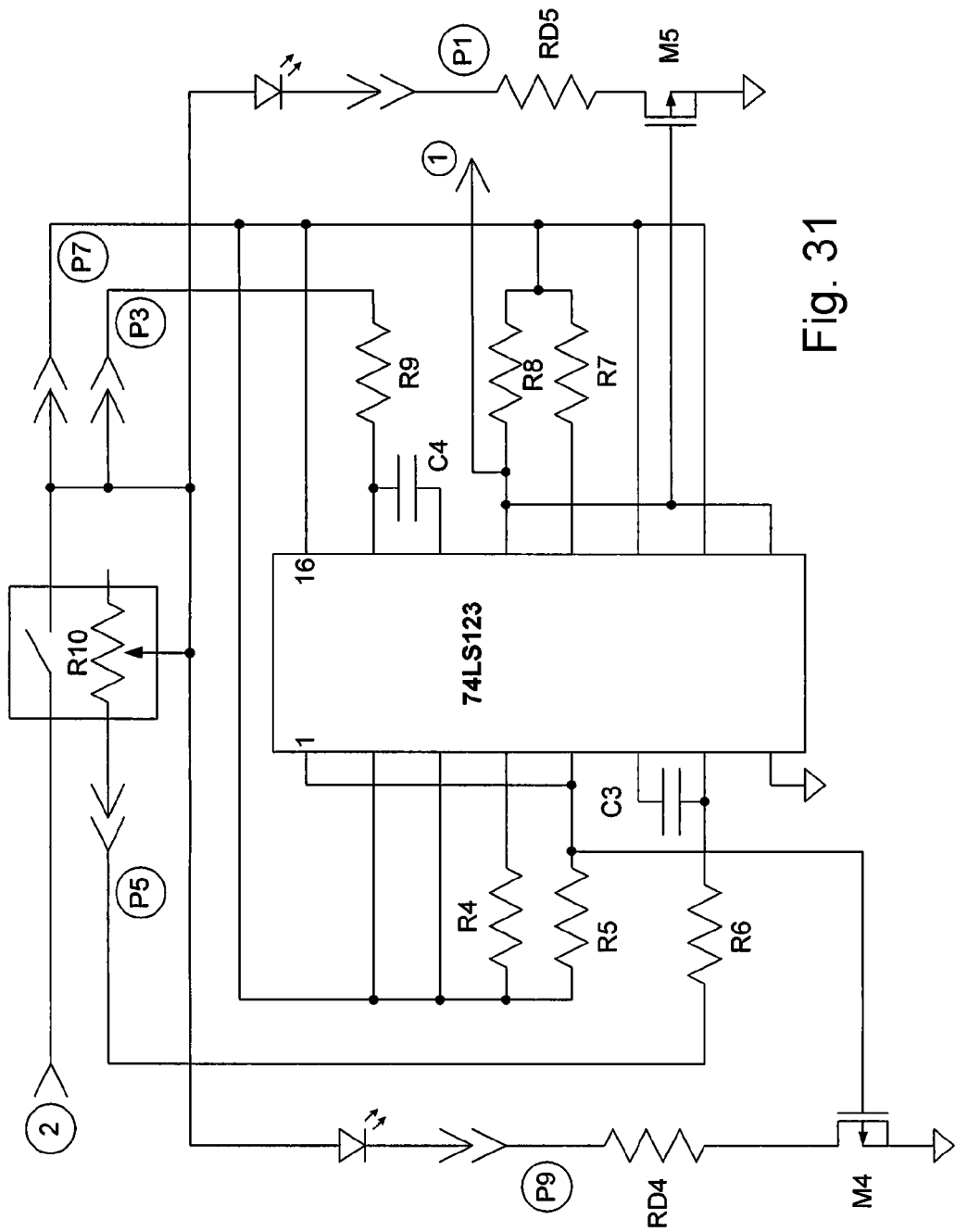
Figure 32:
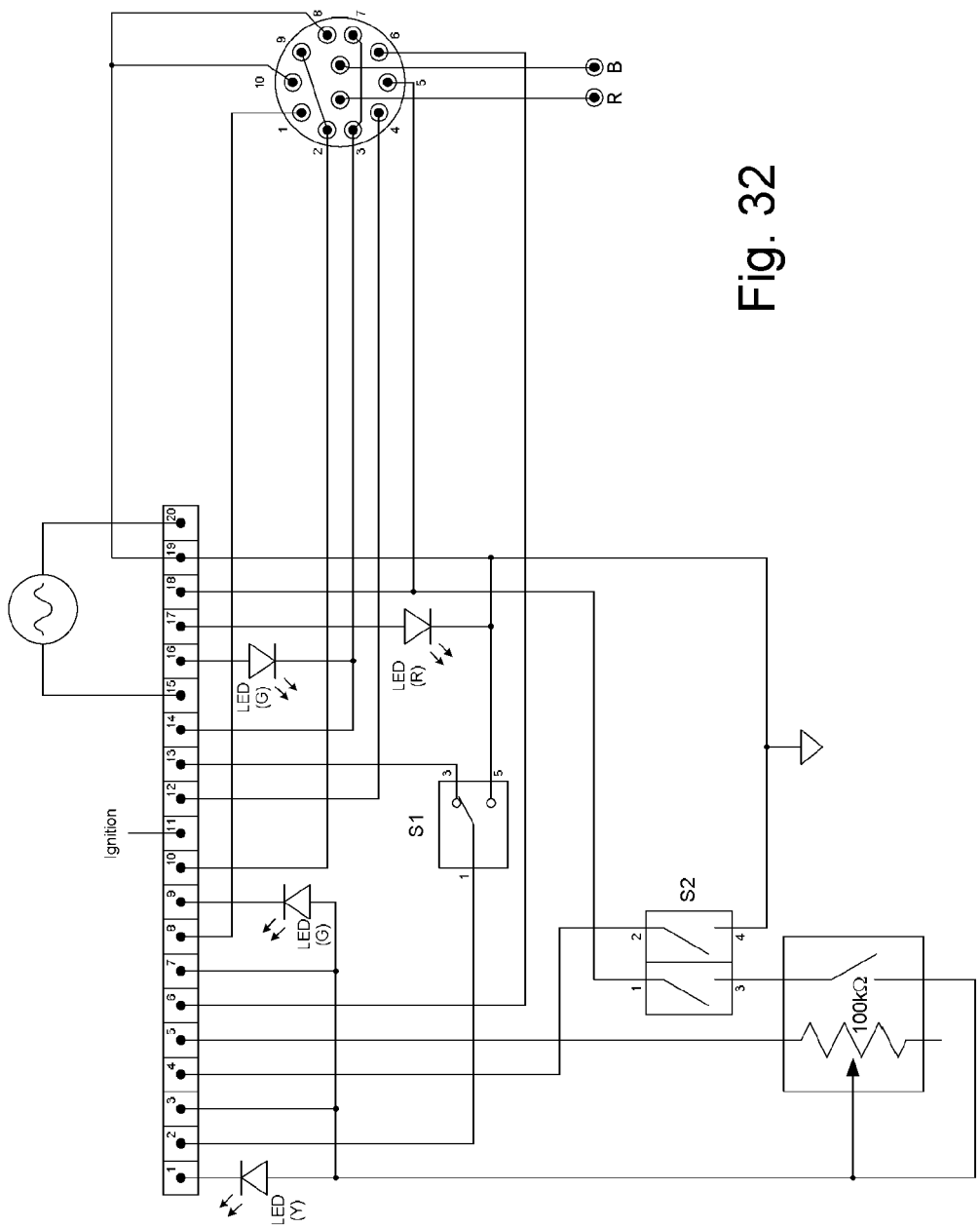
Figure 34:
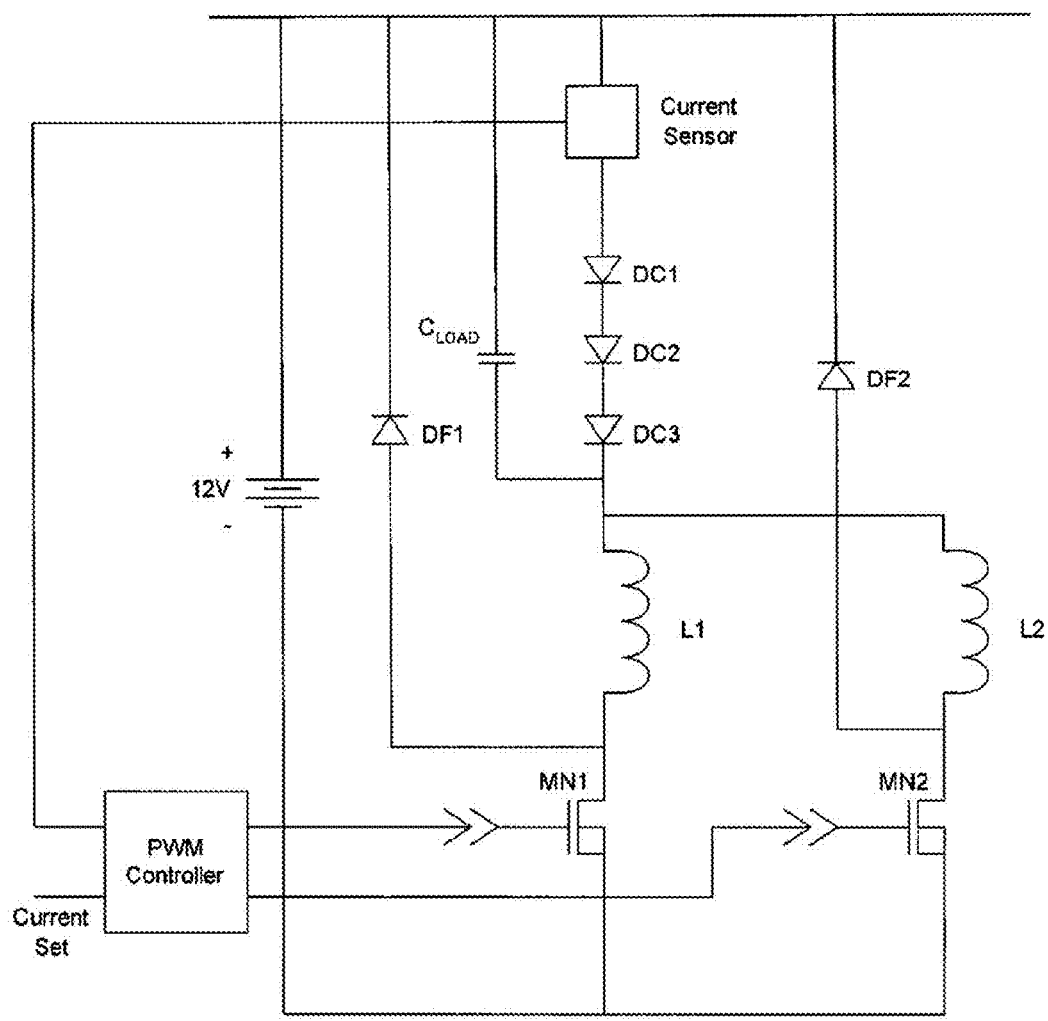
Figure 35:
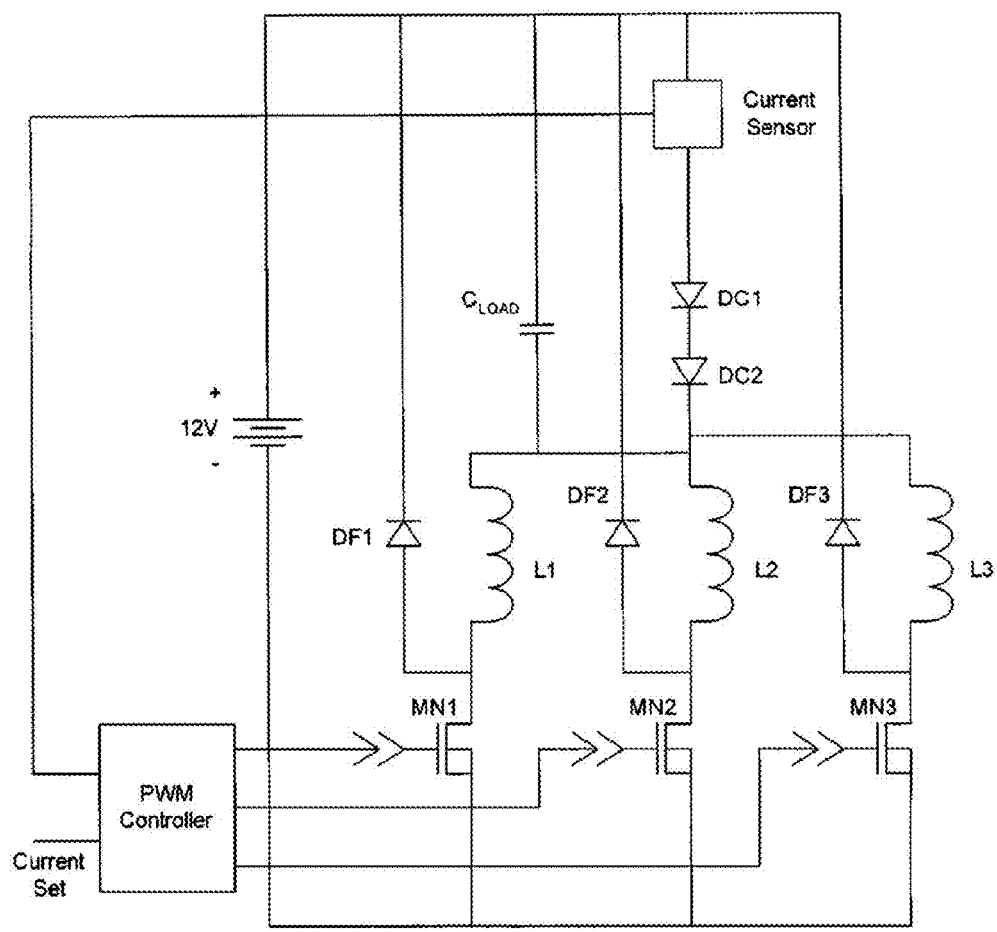

FIGS. 26 and 26a are front and side views of the ½ size plate.
FIGS. 27, 27a and 27b are front, side and end views of the ⅕ size plate.
FIG. 28 is a circuit diagram for control system bias.
FIG. 29 is a circuit diagram of the control system driver.
FIG. 30 is a circuit diagram of the controls for replenishing electrolyte and monitoring temperature of the electrolyte.
FIG. 31 is a circuit diagram of the pulse generator for controlling gas production.
FIG. 32 is a circuit diagram for the control display.
FIGS. 33, 33a and 33b are views of a full size stainless steel plate for a core.
FIG. 34 is a circuit diagram of an alternative constant current switching power supply.
FIG. 35 is a schematic circuit diagram of the generator circuit powered by the constant current switching power supply.

V. DESCRIPTION OF AN EMBODIMENT

Overview

FIGS. 1 and 2 illustrate the electrolytic HHO generator 2. HHO is a stoichiometric mixture of hydrogen gas 12 and oxygen gas. Electrolyte 4 is contained within a case 6. Electrolyte 4 may be any suitable electrolyte known in the art, but a solution of potassium hydroxide (KOH) in distilled water has proven suitable in practice. Case 6 has a body 8 and may have a lid 10. Lid 10 is attached to bottom of body 8 by bolts 11. Case 6 has an inside 3 and an outside 5. Alternatively, case 6 may be sealed, as by welding, so that there is no lid 10 or other removable access panel.

Where a removable lid 10 is used, lid 10 is attached to bottom of case 6 to prevent escape of hydrogen gas 12 generated during operation of the apparatus. Hydrogen gas (H2) 12 has a very low viscosity and readily passes through conventional gaskets and sealants. Placing lid 10 at the bottom of the body 8 provides that the lid 10 to body 8 connection is submerged in the electrolyte 4. The electrolyte effectively seals the lid 10 to body 8 connection, preventing escape of hydrogen gas 12.

Cores 14 are electrically connected in series and submerged in electrolyte 4. The cores 14 are supported within the case 6 by electrode assembly 16. Electrode assembly 16 penetrates case 6 at electrode penetration 7 and is sealed to prevent leakage of electrolyte through the electrode penetration 7. If a removable lid 10 is not used, electrode assembly 16 penetrates the bottom or side of case 6 below the level of the electrolyte 4 when the HHO generator 2 is in operation.

The number of cores 14 contained within the case 6 determines the suitable voltage at which the generator 2 operates. Six cores are suitable for the typical internal combustion engine power system of 12 VDC. An HHO generator 2 featuring two cores 14 would be suitable for operation at 4 VDC. The appropriate size for the stainless steel plates 38 is selected to correspond to the selected number of cores 14, filling the available volume of the case 6 with cores 14 and providing the maximum surface area of stainless steel plates 38 available for electrolysis.

Cores 14 may be of any convenient size. Any combination of sizes of cores that will physically fit within the case 6 may be used. For example, by selecting an appropriate size for cores 14, sets of two, three, four, five or six cores 14 may be installed in the case 6.

The size of a core 14 is determined by the size of the stainless steel plates 38 from which the core 14 is constructed.

All other parts are interchangeable. Stainless steel plates 38 of different sizes are illustrated by FIGS. 25, 26, 27 and 32. For example, to achieve a generator 2 having five cores 14, three cores 14 having ⅓ size stainless steel plates 38, as shown by FIG. 27, and two cores 14 having ½ size stainless steel plates 38, as shown by FIG. 26, may be placed within the case 6. As a second example, to achieve a generator 2 having two cores 14, both of the two cores 14 can be composed of full size stainless steel plates 38, as illustrated by FIG. 32, and placed within the case 6.

The cores 14 contained in two or more cases 8 may be electrically connected to provide additional surface area available for electrolysis at a given design voltage. For example, two cases 8 each containing six cores 14 may be connected in series for operation at 24 VDC. A single case 6 containing six cores 14 has proven suitable in practice for motor vehicle applications.

In operation of the six-core 14 embodiment, a DC voltage of approximate 12 volts is applied across electrode assemblies 16 at a current flow of approximately 100 amps. The electrolysis reaction occurs within the cores 14. As illustrated by FIGS. 1, 7, 8, 10, and 19, leakage of electricity between adjacent cores 14 and between the cores 14 and the body 8 or lid 10 is reduced by non-conductive plastic plates 18 that are interposed between the cores 14 and between the ends, sides and bottom of the cores 14 and the body 8 and lid 10. The connections between plastic plates 18 are not water tight and electrolyte may move around the plate 18 junctions; however, plates 18 define chambers 20 around each core 14 and define a flow path for electrolyte circulation through and around each core 14 during operation of the apparatus.

The electrolytic reaction within the apparatus is violent and liquid electrolyte must be separated from the hydrogen gas 12 prior to use. The gas-electrolyte separator is illustrated by FIG. 1 and comprises a perforated separator plate 22 and stainless steel wool 24. In use, hydrogen gas 12 and electrolyte 4 spray pass through perforations 26 in separator plate 22 and enter stainless steel wool 24. The electrolyte 4 spray collects on the stainless steel wool 24 and returns to the pool of electrolyte 4 covering the cores 14. The hydrogen gas 12 passes through the outlet 28 for injection into the internal combustion engine or for other use. The portion of the separator plate that is beneath the outlet may be un-perforated, or the perforations may be blocked as by a plastic plate, to force the hydrogen gas 12 to follow a longer flow path to the outlet 28 and hence pass through more stainless steel wool 24 and achieve better separation from electrolyte 4.

The separator plate 22 is retained in position by nuts 30 attached to studs 32. Stand-offs 34 maintain the separator plate the desired distance from the top of body 8. FIG. 18 illustrated the perforated separator plate 22 and stand-offs 34.

Penetrations 36 in the top of the body 8 provide access for one or more sensors (not shown) and allow connection to a pump to replenish the distilled water in the electrolyte 4. The case 6, body 8, lid 10 penetrations 36 and outlet 28 are illustrated by the photograph of FIG. 2, in which six cores 14 are contained within the same case 6. Conventional automotive spark plugs 37 shown by FIG. 2 have proven suitable in practice to seal case penetrations for sensors connections, such as electrolyte level sensors, because the spark plug 37 can convey an electrical signal through the stainless steel case and because the spark plug 37 and its stainless steel gasket form an effective seal against escape of hydrogen gas.

Construction of the Cores

The construction of each of the cores 14 is illustrated by FIGS. 3, 5, 6, 8, 16, 17 and 19. As shown by FIGS. 3, 5, and 8, each core 14 includes a plurality of stainless steel plates 38. FIGS. 3, 5 and 8 include a relatively small number of plates 38 in each core 14 for ease of illustration. In the case of FIG. 3, a total of fourteen plates 38 are illustrated, with seven plates 38 being positively charged and seven negatively charged. The actual number of plates 38 is limited only by the space available and by how thin the plates can be constructed with the requisite mechanical strength to resistance deformation and to prevent touching of adjacent plates 38. In practice, providing each of the six cores with forty plates 38 each has proven suitable.

As shown by FIGS. 3, 5 and 8, each core 14 features two core connectors 40. Electrical current is applied to the core 14 at core connector 40. One core connector 40 is connected mechanically and electrically to half of the plates 38 in the core 14 and the other connector is attached to the other half of the plates in the core 14. When counting the plates 38 from one side of the core 14 to the other, odd number plates 38 in the core 14 are connected to one connector 40 and even number plates 38 are connected to the other connector 40. An elongated core fastener, which can be a bolt 42, attaches each connector 40 to its corresponding plates 38. Washers 44 on the bolt 42 and interposed between the plates 38 separate the plates 38 and determine the spaced-apart relation between the plates 38. Each plate 38 features a cutout 46 to prevent the plate 38 from touching the bolt 42 or washers 44 of the other set of plates 38. The bolt 42 is in threaded engagement with its corresponding core connector 40, firmly bolting the plates 38 and washers 44 to the core connector 40 and maintaining the even or odd numbered plate 38 in parallel, spaced-apart alignment. Any other suitable means to attach the elongated core fastener 42 to the core connector 40 may be used, such as welding the plates 38 to the elongated fastener 42 or to the core connector 40, providing an interference fit between the plates and elongated fastener 42, or providing an interference fit between the elongated fastener 42 and the core connector 40. The use of stainless steel bolts 42 and washers 44 to join the even or odd plates 38 has proven suitable in practice to convey a large electrical current with low resistance.

The bolts 42, core connector 40 and washers 44 do not connect the even numbered plates 38 to the odd numbered plates 38. The even and odd numbered plates 38 are connected and held in alignment with respect to each other to form the completed core 14 by non-conducting core plate connectors 48. The non-conducting core plate connectors 48 are selected from the list consisting of a rod, a clip, a pin, a fiber and an adhesive. Where a non-conducting connector 48 is a rod, the rod may be threaded and penetrate connecting holes 51 through both the even and odd numbered plates 38. Non-conducting spacers 52 may be interposed between adjacent plates 38. Nuts 50 may hold threaded rods 48 in position. The even and odd numbered plates 38 may be joined by any other electrically non-conductive means that allows circulation of electrolyte 4 between the plates 38 while maintaining a separation between the plates 38. FIGS. 3 and 5 show only two non-conducting threaded rods 48 and the associated nuts 50 and washers 52 for clarity of illustration. The actual number of non-conducting threaded rods 48, nuts 50 and washers 52 is any number required to maintain the plates 38 in alignment. FIG. 16 shows a core with seven non-conducting threaded rods 48.

The assembled core 14 has the three dimensional rectangular shape 53, illustrated by FIG. 3, with the two core connectors 40 disposed on opposing corners of the three dimensional rectangular shape 53. When cores 14 are connected in series, the core connectors 40 join adjacent cores 14, as illustrated by FIGS. 9, 10, 17 and 19.

All of the metal internal components of the apparatus 2 that will come in contact with liquid electrolyte 4 are composed of stainless steel. Although stainless steel is an electrical conductor, it not a good conductor and is selected for this application based on its ability to survive in the hostile environment of the electrolyte 4 and high DC current flow. The HHO generator 2 circuit elements that are exposed to electrolyte 4 and through which current will flow, which includes the plates 38, connectors 40, bolts 42, washers 44 and support plate 64, all are composed of stainless steel. The electrical resistance within the stainless steel is significant. To provide adequately low resistance, the dimensions of stainless steel parts through which current will flow are constructed with much larger dimensions than would be the case if those components were composed of a better conductor, such as copper.

The electrode 60 is composed of a metal that is a better conductor than stainless steel. Electrode 60 may be composed of copper, silver, aluminum or an alloy that contains copper, silver or aluminum. An example of a suitable alloy for electrode 60 is brass. Use of a relatively good conductor such as brass for the electrode 60 provides that electrode 60 may be much smaller than if the electrode 60 is composed of stainless steel. The relatively small brass electrode 60 allows case penetration 7 to be smaller and to be more easily sealed against leakage of electrolyte 4 or HHO 56 than if the case penetration 7 were large to accommodate a stainless steel electrode 60. A copper or brass electrode 60 is subject to corrosion if the copper or brass electrode 60 comes in contact with the electrolyte 4. Bushing 64 and O-rings 68 prevent electrolyte 4 from contacting and corroding electrode 60.

The arrangement of the connectors 40, bolts 42, washers 44 and plates 38 also is selected to balance the electrical resistance seen at each location in the core 14, so that each plate 38 within the core 14 receives the same amount of current flow and no plate 38 or pair of plates 38 is starved of electrical current flow. This balancing of resistances through the core 14 causes each pair of plates 38 to generate similar amounts of HHO 56.

The balancing of resistances caused by the configuration of the core 14 is illustrated by FIG. 3 and FIGS. 6a and 6b. Electrical current 54 travels a similar distance from the first core connector 40 to the second core connector 40, which are located at opposite corners of the core 14, regardless of which pair of plates 38 the current 54 flows through and regardless of what location on the pair of plates 38 the current 54 flows through. Because the current flows through a similar distance through the stainless steel connector 40, bolts 42, washers 44, and plates 38 for each available flow path through the core 14, the resistance is similar for each available flow path through the core 14. Because the resistance is similar, the current flow through the plates 38 is balanced and the entire area of each pair of plates 38 will produce HHO 56, with no location on the plates 38 starved for electrical power. The plates 38 on the outside of the core 14 interact with only one other plate 38, rather than two, and are not as productive as the remaining plates 38 in the core 14.

The configuration of the cores 14 for balanced resistance can also be carried through for the series connection of six cores 14, as shown by FIGS. 9, 10 and 19. FIG. 9 is a top view of a series of six cores 14, each connected at a corner to another core 14 using the core connector 40. Each of the cores 14 is internally balanced, as described above. FIG. 10 is a cutaway of the body 8 and show the six cores 14 of FIG. 9 installed. Plastic plates 18 separate the cores 14 and also separate the cores 14 from the body 8 sides, ends and lid 10. The plastic plates 18 prevent electrical leakage between each cores 14 and body 8, lid 10 and other cores 14.

From FIG. 9, when multiple cores 14 are connected in series, the HHO generator will have a first end core 57, a second end core 59 and intermediate cores 61. The first core connector 40 of the first end core 57 is attached to the first support plate 64. The second core connector 40 of the second end core 59 is attached to the second support plate 64. Each of the other core connectors 40 of the end cores 57, 59 and intermediate cores 61 are shared between two adjacent cores 14, with the core connector 40 serving as the first core connector 40 for one core 14 and as the second core connector 40 for the adjacent core 14.

Circulation of the Electrolyte

The plastic plates also define a chamber 20 directing electrolyte flow around and through the core 14. FIGS. 7 and 8 illustrate the flow of electrolyte 4 when the apparatus 2 is in operation. As shown by FIG. 7, when current is passing from a plate 38 through the electrolyte 4 to the adjoining plate 38, water in the electrolyte 4 electrolyzes into bubbles of HHO 56 consisting of a mixture of gaseous hydrogen gas 12 and oxygen. The buoyancy of the hydrogen gas 12 causes it to rise, indicted by arrows 58. The moving HHO bubbles 56 also move the surrounding electrolyte 4, causing the electrolyte 4 to circulate through the core 14, as illustrated by FIG. 8.

FIG. 8 is an end view of the operating core 14 enclosed within the core 6. The circulating electrolyte 4 rises through the core 14, flows substantially within the chamber 20 defined by plastic panels 18 downward around the outside of the core 14 and upward through the bottom of the core 14, all as indicated by arrows 60. The circulation is violent and acts to strip bubbles of hydrogen 12 and oxygen from the plates 38, making those locations on the plates 38 available to electrolyze water into additional hydrogen 12 and oxygen.

Surface treatment of the plates 38 assists in electrolysis and stripping of bubbles of HHO 56. In the manufacturing process, the plates 38 are sanded to create vertical scratches in the surface of each plate 38. The vertical scratches are oriented with the long dimension of the scratches in the direction of electrolyte 4 flow. The scratches provide greater surface area on the plates 38, contributing to bubble formation. The orientation of the scratches aids the stripping of the bubbles from the plates 38. The sanding during manufacturing also serves to remove contaminants from the surface of the plates 38 that could interfere with current flow and hence electrolysis.

To assist in circulation of the electrolyte 4, the dimensions on the sides and bottom of the chamber 20 are selected to generally equal the horizontal liquid cross section of the core 14. As a result, electrolyte 4 moves at a generally constant speed as it circulates through and around the core 14.

Electrical Characteristics of the Cores

The inventors herein have discovered that the surfaces of the plates 38 and the electrolyte 4, when in operation, behave like a diode. This discovery has profound effects on the design of the electrolysis apparatus 2 and of any electrolysis apparatus for any purpose.

A demonstration of this effect is illustrated by FIG. 11. FIG. 11 shows the results of an actual test of an actual pair of plates 38 in electrolyte 4. The 'y' axis of the graph of FIG. 11 is logarithmic and is the measured current flowing between the plates 38. The 'x' axis is linear and is the applied DC voltage. Of interest is the region of the graph around 2 volts that plots as a straight line, meaning that current flow in this region changes exponentially for a linear change in voltage. Experience has shown that with increasing voltage (more than about 2.25 vDC on FIG. 11), the plot changes from exponential to linear. FIG. 11 shows the very beginning of this transition. The above describes the behavior of a diode.

The general shape of a response curve of a diode is illustrated by FIG. 12. The different response curves represent systems having different electrical resistances. As the overall resistance of the system drops, the efficiency of hydrogen gas 12 production increases while on the exponential portion of the slope. The greatest efficiency is achieved by operating within the exponential portion of the curve (which graphs as a straight line) and at the highest current flow for a given applied voltage. This corresponds to the lowest overall resistance of the system.

Achieving Low Resistance

As noted above, achieving low resistance with stainless steel as a conductor requires that the stainless steel have a relatively large cross-sectional area. FIG. 4 illustrates the penetration of the case 6 by the electrode 60 and support of the cores 14 within the body 8.

As shown by FIG. 4, electrode 60 penetrates case 6 through an electrode penetration 7. Electrode 60 is composed of brass, which contains copper and is a better conductor than stainless steel. Electrode 60 therefore can be of smaller cross sectional area than the other components in the electrical flow path and the electrode penetration 7 of case 6 can be relatively small in diameter. Since the electrode 60 is not exposed to the electrolyte 4, brass is adequately durable. Core 14 having core plate 38 is supported by core connector 40, which is bolted to support plate 62. Electrode 60 is in threaded engagement with support plate 62. Support plate 62 and electrode 60 are electrically insulated from case 6 by non-conducting bushing 64. Electrolyte 4 is prevented from escaping through the electrode penetration by the clamping action of electrode nut 66 pulling support plate 62 against the inside 3 of case 6. O-rings 68 further prevent leakage of electrolyte 4 through electrode penetration 7. O-rings 68 are disposed in first and second annular grooves 71, 73 on opposite sides of non-conductive bushing 64. Electrode 60 passes through O-ring openings 69 and through bushing opening 65, defined by non-conducting bushing 64. The relatively large-dimensioned stainless-steel parts of the electrode assembly 16 also serve to firmly support the cores 14.

One embodiment of support plate 62 is shown in tops, side and end views by FIGS. 21, 21a and 21b. Non-conducting bushing is shown in plan by FIG. 22 and by cross section FIG. 22a. Electrode 60 is shown as a threaded rod by FIG. 23 and in end view by FIG. 23a. Core connector 40 is shown in top, side and end views by FIGS. 24, 24a and 24b.

Other design features to achieve low resistance include choosing a relatively large diameter for bolt 42 and washers 44, and selecting a robust core connector 40. Another feature to achieve a low resistance is to locate adjacent plates 38 very close to each other within core 14. Any touching of the plates 38 would cause a short, damaging the core 14 and interfering with HHO 56 production. The core 14 design features described above, including the non-conducting core plate connector 48, the plurality of non-conducting spacers 52 and the connector nut 50, allow very close location of adjacent plates 38 in a core 14, providing low resistance between adjacent plates 38. Ramping of the current on shutoff, as discussed below, prevents arcing between the plates 38 due to 'inductive kick' and allows the plates 38 to be located close together.

Limiting Current Flow Through the Electrolyte

A persistent problem with prior art electrolysis units for hydrogen generation has been the overheating and boiling of the electrolyte 4. The problem is caused by an inherent characteristic of the diode nature of the electrolyte 4 and the cooperating surfaces of the plates 38; namely, as the plates 38 and the electrolyte 4 heats as a result of the very high current flow through the cores 14, the resistance of the electrolyte 4 and cooperating surfaces of the plates 38 goes down. Since the resistance goes down, current flow through the plates 38 and through the electrolyte 4 will go up. The effect of the increased current flow is to heat the electrolyte 4 even more, causing a further drop in the resistance. The result is runaway heating of the electrolyte 4 and failure of the HHO generator 2.

The inventors have developed two solutions to the problem. The first is illustrated by FIG. 13. FIG. 13 is a schematic circuit diagram. A generating system 70 supplies approximately 14 volts DC, which is typical for a motor vehicle or stationary internal combustion engine. The generating system 70 applies positive voltage to a ballast resistor 72 that is located outside the case 6 and hence is not in contact with the electrolyte 4. The ballast resistor 72 has a small resistance, on the order of 0.01 to 0.02 ohms. The ballast resistor 72 is configured to handle a high current, such as 100 amps. A ballast resistor 72 composed of a bar of stainless steel and as shown in FIG. 2 and in FIGS. 20, 20a and 20b has proven suitable in practice. The length and hence the resistance of the ballast resistor 72 can be selected by selecting the appropriate attachment points 73.

If the temperature of the electrolyte 4 and the corresponding surfaces of the plates 38 increases, then the resistance of the HHO generator 2 goes down and current flow through the circuit increases exponentially with increasing electrolyte 4 temperature. Since the increased current is flowing through the cores 14, the same increased current also is flowing through the ballast resistor 72, which is connected in series with the cores 14. From the familiar V=IR relation of voltage, current and resistance in the ballast resistor 72, the increase in current through the ballast resistor 72 causes an increase in the voltage drop across the ballast resistor 72. Because the generating system 70 features a constant supplied voltage, the increased voltage drop across the ballast resistor 72 results in a lower voltage across the cores 14. The lower voltage across the cores 14 results in an exponentially lower current flow through the cores 14 (see FIGS. 11 and 12), reducing the heat released into the electrolyte 4 and allowing the electrolyte 4 and cores 14 to cool. Because the ballast resistor 72 is outside the case 6 (see FIG. 2), the heat generated in the ballast resistor 72 is dissipated into the air and does not heat the electrolyte 4.

The thermal response of the ballast resistor 72 also contributes to moderating current flow through the cores 14. The ballast resistor 72 has a resistance that increases with increasing temperature and heating the ballast resistor 72 increases its resistance. An increase in current flow due to overheating of the electrolyte 4 will increase the temperature of the ballast resistor 72 and hence will increase the resistance of the ballast resistor 72. The increase in resistance increases the voltage drop across the ballast resistor 72 and reduces the voltage drop across the cores 14. The drop in voltage across the cores 14 exponentially reduces current flow through the cores 14, allowing the electrolyte 4 to cool.

The dynamic interaction of voltage and current flow of the ballast resistor 72 and of the combination of the electrolyte 4 and the corresponding surfaces of the plates 38 defines a negative feedback relation. The negative feedback relation stabilizes the temperature of the electrolyte 4 and the surfaces of the plates 38 and prevents run-a-way heating of the electrolyte 4.

In FIG. 13, each of the six cores 14 is illustrated as a diode, which reflects its electrical characteristics. The R (internal) resistor 74 is a schematic representation of all other resistance in the system, including all resistance of wiring, internal components of apparatus, the plates 38, bolts 42, washers 44, core connectors 40, and electrode assembly 16. R (internal) 74 represents a loss of efficiency of the system. The lower the R (internal) 74, the higher the efficiency of the system.

The second solution to the problem of overheating of the electrolyte 4 is illustrated by FIG. 14. The system of FIG. 14 utilizes a current source 75 that provides constant current, say, 100 amps. The system achieves constant current by using data from a current sensor 76 to advise a voltage controller 78 to control the voltage supplied to the circuit. Since the current is constant, the electrolyte 4 will not overheat and is thermally stable, even if the resistance of the electrolyte 4 decreases due to heating.

Other power sources can supply a constant current to the generator and thus avoid overheating of the electrolyte. Examples are the switching power sources illustrated by FIGS. 34 and 35. FIG. 34 is a schematic diagram of a two phase current source. From FIG. 34, the cores 14 are represented electrically by the three series diodes (DC1,DC2,DC3) connected to the top. The source works on the negative side; hence the nominal operating voltage is −6 volts. The nominal voltage source, on the left, is −12 to −15 volts. The two switches (MN1, MN2) on the bottom operate 180 degrees out of phase. At peak current output one switch carries 100 amps through L1 and the other switch is open. L2 returns 100 amps through the fly back diode DF2 for a total of 200 amps through DC1, DC2 and DC3. The input power is equal to 100 amps×12 volt=200 amps×6 volts=1200 Watts.

FIG. 35 is a schematic circuit diagram for a three phase current source. The cores 14 are represented electrically by the two series diodes (DC1, DC2) connected to the top. The source works on the negative side; hence the nominal operating voltage is −4 volts. The nominal voltage source, on the left, is −12 to −15 volts. The three switches on the bottom operate 120 degrees out of phase. At peak current output one switch carries 100 amps through L1 and the other two switches are off. (L2, and L3 return each 100 amps through the fly back diodes (DF2, DF3) for a total of 300 amps. The input power is 100 amps×12 volt=300 amps×4 volts=1200 Watts.

The switching power sources illustrated by FIGS. 34 and 35 offer essentially no resistance, and hence higher overall HHO 56 production efficiency, unless the power source is limiting current flow to protect the HHO generator 2. The switching power sources of FIGS. 34 and 35 also offer the advantages of simplicity and hence lower cost.

Controlling Gas Production

A. Limiting Electrical Load to Available Electrical Generating Capacity

The hydrogen generator 2 is equipped with two HHO flow control features. One feature tailors the electrical load that the apparatus 2 places on the electrical generating system 70 to the capabilities of the generating system 70. The second feature permits the dynamic variation of the HHO 56 flow rate during operation of the motor vehicle or stationary engine while retaining high efficiency in generating HHO 56.

The first feature allows for the selection of the electrical load impedance of the hydrogen generator 2. Selection of a lower load impedance provides higher HHO 56 flow rates but results in higher demands on the electrical generating system 70. Conversely, selection of a higher load impedance results in lower HHO 56 output but reduces the electrical demands on the electrical generating system 70. The user thus can select a load impedance of the hydrogen generator 2 that matches the capabilities of the available electrical generating system 70.

For example, a user may choose to run the hydrogen generator 2 on the existing excess power of the electrical generating system 70 of a motor vehicle or stationary engine by selecting an appropriately high impedance for the hydrogen generator 2. If the electrical generating system 70 of the motor vehicle or stationary engine does not have sufficient excess capacity to generate the desired amount of HHO 56, the user can choose to install a more powerful electrical generator 70. This feature of matching the load impedance of the hydrogen generator 2 to the capability of the electrical generating system 70 is believed to be unique to the invention.

The load impedance is selected at the time of installation of the apparatus 2 on the motor vehicle or stationary engine and requires partial disassembly of the apparatus 2. One way to select the load impedance of the hydrogen generator 2 is to adjust the resistance of the ballast resistor 72, as shown by FIGS. 2, 13, 15, 20, 20*a* and 20*b*. From FIG. 20 one way to adjust the resistance of the ballast resistor 72 is to select the length of the ballast resistor 72 through which electrical current will flow when the apparatus 2 is in operation and generating HHO 56. The longer the length of the ballast resistor 72 through which current will flow, the higher the load impedance. Selecting the length of the ballast resistor 72 does not require changing the ballast resistor 72 and can comprise selecting the locations 73 on the ballast resistor 72 at which electrical connections are made. The ballast resistor features 72 a series of mounting holes 73 along its length. The variable resistor 80 is mounted to the ballast resistor 72 at a selected mounting hole 73, defining the length of the ballast resistor 72 through which current will flow and hence the load impedance.

B. Physically Constricting the Flow of Hydrogen Gas Coupled with Rapid Switching of the Hydrogen Generator 'on' and 'Off'

The second control feature is to vary the HHO flow rate, including dynamically varying the HHO 56 flow rate while the motor vehicle or stationary engine is in operation.

For the cores 14 to generate HHO 56 efficiently, voltage across each core 14 and hence current flow through the cores 14 must fall within narrow ranges. As a result, the apparatus 2 is either 'on,' with the design current flowing through the cores 14 and the cores 14 efficiently producing HHO 56, or it is 'off,' with no current flowing through the cores 14 and the cores 14 producing no HHO 56. Switching the apparatus 'off' and stopping current flow to the cores 14 is achieved by raising the impedance of variable resistor 80 of FIGS. 2 and 15 to a very high value. Switching the apparatus 'on' and allowing current to flow through the cores 14 is achieved by lowering the impedance of variable resistor 80.

The controller 82 controls variable resistor 80 and defines how much hydrogen 12 will be supplied to the internal combustion engine by determining how much of the time the apparatus is 'on' with current flowing through the cores 14. The controller 82 cycles rapidly between 'on' and 'off' based on signals from a pulse generator illustrated by FIG. 31 and described below. Experience has shown that for best results the 'off' time should be fixed and the 'on' time varied to obtain the desired HHO 56 flow rate. A fixed 'off' time of approximately two seconds has proved suitable in practice. The 'on' time is determined by the amount of hydrogen gas 12 production selected by the operator and an 'on' time of up to 20 seconds has proved suitable in practice.

The HHO 56 flow rate to the internal combustion engine must be maintained during the 'off' periods. To achieve a continuous flow of HHO 56, and as shown by FIG. 1, the apparatus 2 is equipped with a flow constrictor 86 and with a head space 84 in the case 6 above the elevation of the electrolyte 4. When the apparatus 2 is 'on,' HHO 56 generated in the cores 14 collects in the head space 84, which acts as a reservoir for the HHO 56. HHO 56 pressure builds in the head space 84 and HHO gas 56 continuously exits through the flow constrictor 86 and to the internal combustion engine. When the apparatus 2 is 'off' and HHO 56 is no longer generated, HHO 56 continues to flow under pressure from the head space 84 and through the flow constrictor 86 to the engine. The headspace 84 and the flow constrictor 86 in combination dampen fluctuations in flow of HHO from the apparatus 2.

The flow rate, both during the 'off' and the 'on' periods, is defined by the differential HHO 56 pressure across the flow constrictor 86 and by the resistance to gas flow created by the flow constrictor 86. The resistance to gas flow of the flow constrictor 86 and the volume of the headspace 84 are selected so that adequate differential pressure across the flow constrictor 84 is maintained during the 'off' periods to provide a desired flow rate of HHO to the engine both during 'on' and 'off' periods.

The flow constrictor 86 comprises a tube. The resistance to gas flow of the flow constrictor 86 is adjusted by selecting the length and internal diameter of the tube. A stainless steel tube having an internal diameter of 27 mil has proven suitable in practice as the flow constrictor 86. A design HHO 56 pressure within the headspace 84 of approximately two atmospheres has proven suitable in practice. In testing of a prototype apparatus 2, a substantially constant HHO 56 flow rate was perceived through direct observation of bubbles of HHO 56 in a water jar for HHO 56 flow rates of between 1% and 99% of the design maximum.

C. Ramping of Voltage and Current

Turning the apparatus 2 'on' and 'off' creates a periodic load of approximately 100 amps on the electrical generating system 70. As a result, the apparatus 2 is prone to a large inductive kick of thousands of volts if the switching edges are not controlled. 'Inductive kick' is a well-known phenomenon in which the inductance of a circuit will cause a voltage spike in circuit components upon a sudden breaking of the circuit. An inductive kick in the apparatus 2 could cause a high potential across the gap between the plates 38, resulting in a spark jumping the gap. Because of abundant free hydrogen 12 and oxygen between the plates 38, the spark could ignite the hydrogen 12 in the body 8.

In the control system illustrated by FIG. 15, a variable resistor 80 ramps the applied voltage from power supply 70 either up or down. Ramping of the voltage and current up and down prevents the 'inductive kick.' The variable resistor 80 can be in the form of one or more n-MOSFETs in parallel. A set of three 80 amp n-MOSFETS has proven suitable in practice. The internal resistance 74 is minimized by placing the MOSFETs directly on the ballast resistor 72, as illustrated by FIG. 2. The n-MOSFETS are driven by a control voltage ramp circuit which results in a smooth transition of the switch-on resistance from 0.001 ohms to megohms.

The control system of FIG. 15, including the controller 82 and n-MOSFET switch 80, has been built and tested with results showing no more than a few volts across the cores 14 during switching.

D. Controller Circuit Diagrams

FIGS. 28 through 32 are circuit diagrams of the controller 82. FIG. 28 illustrates the biasing circuit, which provides a 5 volt and a 10 volt regulated voltage source powered by standard automobile battery voltage for the other circuits in the system. The regulated voltage sources are referenced from two Zener diodes (D1, D2) and buffered through two operational amplifiers provided by the LF444B integrated circuit. Q21 and Q22 provide low impedance outputs for the driven circuitry. The capacitors C1, C2, C21 and C22 provide power supply rejection at elevated frequencies and noise reduction. Diode D3 protects the circuit from high or low over voltage stress. The circuit can withstand +/−40 volt applied to the power terminal without incurring damage. The function range of input voltage is 11V to 30V.

FIG. 29 illustrates the driver circuit. The driver circuit controls the power to the electronic board, the ON/OFF of the generator 2, and a false ON alarm. The false ON alarm sounds when the unit is OFF and it becomes active due to some external activity; for example, if the circuit is shorted as by a screwdriver or other conductor so that the variable resistor 80 no longer controls current flow through the generator 2, or if the variable resistor 80 is stuck in the 'on' position. The purpose of the false ON alarm is to alert the operator that the unit still is active even though shut off. The LM311 generates a pulse signal that activates a buzzer (Buzz) when P14 has an unintended path to ground. S1 of the driver circuit of FIG. 69 is a mechanical switch that powers the board and turns on a red indicator. Q1, Q2, Q3 and Q4 provide the gate drive for the variable resistor 80. C0 controls the ON/OFF speed, R0 defaults the gate drive to zero voltage. The pulse mode is activated by simply canceling the current from RB with a larger current from the oscillator circuit through Q4 and Q2. M1 is the variable resistor 80 and is a 240 amp VMOS comprised of three parallel V groove MOSFETs. The speed of the OFF/ON activation is controlled to maintain minimal inductive kick back when switching up to 240 amps.

FIG. 30 shows the refill circuit. The refill circuit senses the amount of liquid electrolyte 4 in the case 6 and adds more liquid from a storage container when the level drops below the sensor position. The sensor is connected to a modified spark plug that penetrates case 6. The sensor is maintained at the battery voltage when not in contact with the liquid. When the sensor comes in contact with the liquid, the sensor drops to the voltage of the liquid. When the liquid drops below the level of the sensor the LM311 comparator flips and the output of the comparator drives a signal to the water pump switch adding more liquid to the case 6. When the sensor re-contacts the liquid the pump is turned OFF. The re-fill tube contains a one way valve that prevents the liquid from back flowing.

FIG. 31 shows the pulse generator circuit. The pulse generator circuit creates pulses of varying duty cycle, where the OFF time is set to constant value (e.g., two seconds) with R9 and the ON time is varied by rotating a potentiometer (100k) provided on the control panel (e.g., 0.2 seconds to 20 seconds). By tuning the generator 2 in this way the flow rate of HHO gas can be varied. The 74LS123 is a dual single shot integrated circuit whose pulse duration is controlled by the resistance R9 and R6+100k pot and C3 and C4. Pins 4, 5 12 and 13 are TTL outputs. M4 and M5 are connected to the TTL outputs and drive LED "G" and LED "Y" on the front panel. Output 13 drives the ON/OFF switch of the HHO unit through the DRIVE circuit. The overall result is operator-controlled HHO flow rate.

FIG. 32 illustrates the panel circuit. The panel circuit provides the ON/OFF switches and the LED displays. The panel is interfaced to the control board via a 20 pin ribbon cable. The 5 position switch selects temperature, battery voltage, core voltage, ballast resistor voltage, and 5 volt reference. The unit has a full ON mode and a pulse override mode. The pulse override mode is controlled by the 100 kOhm pot. The circle with the wiggle line is a thermal fuse that resets automatically in the event of over current due to unwanted connection between parts of the circuitry. In the version of the control system 82 illustrated by FIGS. 68-72, the HHO flow rate is manually controlled by the operator. The controller 82 also can be configured to vary the flow rate of HHO automatically based on engine speed, on the load applied to the engine or on other variables as appropriate.

LIST OF NUMBERED ELEMENTS

Electrolytic hydrogen generator 2 or HHO generator 2
Inside 3
Electrolyte 4
Outside 5
Case 6
First and second electrode penetrations 7
Body 8
Interior volume 9
Lid 10
Bolts 11
Hydrogen gas 12
Cores 14
Electrode assembly 16
Plastic plates 18
Chamber 20
Separator plate 22
Stainless steel wool 24
Perforations 26
Nuts 30
Studs 32
Stand-offs 34
Penetrations 36
First and second sets of core plates 38
First and second core connector 40
First and second elongated core fastener (bolt) 42
A corner, a first corner 43
First and second washers 44
An opposing corner, a second corner 45
A clearance cutout 46
A core perforation 47
Non-conducting core plate connector 48
Non-conducting nut 50
A connecting hole 51
Non-conducting spacer 52
Three-dimensional rectangular shape 53
Electrical current flow 54
HHO 56
A first end core 57
Direction of gas flow 58
A second end core 59
First and second electrodes 60
Intermediate cores 61
First and second support plates 62
First and second non-conducting bushings 64
Bushing opening 65
Electrode nut 66
A first and a second O-ring 68
O-ring opening 69
Generating system 70
First annular groove 71
Ballast resistor 72
Second circular grove 73
Internal resistance 74
Current source 75
Current meter 76
Voltage controller 78
Variable resistor 80
Controller 82
Headspace 84
Flow constrictor 86

We claim:

1. An apparatus for generating HHO, the apparatus comprising:
    a. a case, said case having an inside and an outside and defining an interior volume, said case defining an electrode penetration communicating from said outside to said inside of said case;
    b. a core disposed within said interior volume of said case, said core being configured to generate HHO when a liquid electrolyte is contained within said interior volume, at least a portion of said core is immersed in said liquid electrolyte, and a DC current is passed through said core;
    c. an electrode,
    said electrode being disposed within said case penetration and communicating between said outside and said inside of said case, said electrolyte having an electrolyte level when said core is generating HHO, said electrode penetration being located below said electrolyte level;
    d. a support plate, said support plate being located within said interior volume, said support plate being attached to said electrode and to said core, said support plate supporting said core within said interior volume, said electrode being in electrical communication with said support plate and said support plate being in electrical communication with said core;
    e. a non-conducting bushing, said non-conductive bushing defining a bushing opening, said electrode being disposed within said bushing opening, said non-conductive bushing being disposed between said support plate and said inside of said case, said case being electrically conductive, said support plate being electrically insulated from said case, said electrode being under tension, said tension clamping said non-conductive bushing between said support plate and said inside of said case, said non-conductive bushing having a configuration, said configuration being selected to prevent escape of electrolyte or HHO through said electrode penetration and to prevent contact between said electrode and said liquid electrolyte when said liquid electrolyte is contained within said case and said core is generating HHO.

2. The apparatus of claim 1 wherein said configuration of said non-conductive bushing comprising: a first O-ring and a second O-ring, said electrode being disposed within an O-ring opening of said first O-ring and of said second O-ring, said electrode being solid and not hollow, said first O-ring being disposed between said non-conductive bushing and said support plate, said second O-ring being disposed between said non-conductive bushing and said inside of said case, said first O-ring sealably engaging both said non-conductive bushing and said support plate, said second O-ring sealably engaging both said non-conductive bushing and said inside of said case.

3. The apparatus of claim 1 wherein said core defines a three-dimensional rectangular shape, said core comprising: a first and a second core connector, said first and second core connectors being located at diagonally opposing corners of said three-dimensional rectangular shape, said first core connector being in electrical communication with a first set of core plates, said second core connector being in electrical communication with a second set of core plates, said first and said second sets of core plates being interleaved, none of said first set of core plates touching any of said second set of core plates, said first and said second sets of core plates being configured to generate HHO when said first and said second sets of core plates are immersed in said liquid electrolyte and said electrical current is passed from said first core connector to said first set of plates, from said first set of plates to said second set of plates, and from said second set of plates to said second core connector.

4. The apparatus of claim 3 wherein said core is a one of a plurality of cores, each of said cores defining said three-dimensional rectangular shape, said plurality of cores being electrically connected in series.

5. The apparatus of claim 4 wherein said electrode is a first electrode, said support plate is a first support plate, and said non-conductive bushing is a first non-conductive bushing, the apparatus further comprising:
   a. a second electrode disposed within a second electrode penetration through said case, said second electrode penetration being below said level of said electrolyte, said second electrode being attached to a second support plate, said second support plate being disposed within said case, a second non-conductive bushing being disposed between said second support plate and said inside of said case, said second bushing and said second support plate being configured to seal said second electrode penetration against leakage of said electrolyte and said hydrogen through said second electrode penetration and to prevent contact between said second electrode and said liquid electrolyte;
   b. said plurality of cores includes a first end core and a second end core, said first core connector of said first end core being attached to said first support plate, said second core connector of said second end core being attached to said second support plate, each other core connector defining said first core connector of a one of said cores and a second core connector of another of said cores, said first support plate and said second support plate in combination supporting said plurality of cores within said case.

6. An apparatus for generating HHO, the apparatus comprising:
   a. a case, said case having an inside and an outside and defining an interior volume, said case defining an electrode penetration communicating from said outside to said inside of said case;
   b. a core disposed within said interior volume of said case, said core being configured to generate HHO when a liquid electrolyte is contained within said interior volume, at least a portion of said core is immersed in said liquid electrolyte, and a DC current is passed through said core;
   c. an electrode, said electrode being disposed within said case penetration and communicating between said outside and said inside of said case;
   d. a support plate, said support plate being located within said interior volume, said support plate being attached to said electrode and to said core, said electrode being in electrical communication with said support plate and said support plate being in electrical communication with said core;
   e. a non-conducting bushing, said non-conductive bushing defining a bushing opening, said electrode being disposed within said bushing opening, said non-conductive bushing being disposed between said support plate and said inside of said case, said electrode being under tension, said tension clamping said non-conductive bushing between said support plate and said inside of said case, said non-conductive bushing having a configuration, said configuration being selected to prevent escape of electrolyte or HHO through said electrode penetration and to prevent contact between said electrode and said liquid electrolyte when said liquid electrolyte is contained within said case and said core is generating HHO, said configuration of said non-conductive bushing comprising:
   f. a first O-ring and a second O-ring, said electrode being disposed within an O-ring opening of said first O-ring and of said second O-ring, said first O-ring being disposed between said non-conductive bushing and said support plate, said second O-ring being disposed between said non-conductive bushing and said inside of said case, said first O-ring sealably engaging both said non-conductive bushing and said support plate, said second O-ring sealably engaging both said non-conductive bushing and said inside of said case;
   g. a first annular groove appearing on one side of said non-conductive bushing in an annular relation to said bushing opening, said first annular groove being configured to receive said first O-ring;
   h. a second annular grove appearing on an opposing side of said non-conductive bushing in said annular relation to said bushing opening, said second annular groove being configured to receive said second O-ring.

7. An apparatus for generating HHO, the apparatus comprising:
   a. a case, said case having an inside and an outside and defining an interior volume, said case defining an electrode penetration communicating from said outside to said inside of said case;
   b. a core disposed within said interior volume of said case, said core being configured to generate HHO when a liquid electrolyte is contained within said interior volume, at least a portion of said core is immersed in said liquid electrolyte, and a DC current is passed through said core;
   c. an electrode, said electrode being disposed within said case penetration and communicating between said outside and said inside of said case;
   d. a support plate, said support plate being located within said interior volume, said support plate being attached to said electrode and to said core, said electrode being in electrical communication with said support plate and said support plate being in electrical communication with said core, said electrode being in a threaded engagement with said support plate;
   e. a non-conducting bushing, said non-conductive bushing defining a bushing opening, said electrode being disposed within said bushing opening, said non-conductive bushing being disposed between said support plate and said inside of said case, said electrode being under tension, said tension clamping said non-conductive bushing between said support plate and said inside of said case, said non-conductive bushing having a configuration, said configuration being selected to prevent escape of electrolyte or HHO through said electrode penetration and to prevent contact between said electrode and said liquid electrolyte when said liquid electrolyte is contained within said case and said core is generating HHO;
   f. an electrode nut disposed on said outside of said case, said electrode nut being in threaded engagement with said electrode, said electrode nut being electrically insulated from said case, said electrode nut and said support plate in cooperation applying said tension to said electrode.

8. The apparatus of claim 7 wherein said support plate is composed of a stainless steel and said electrode is composed of a better electrical conductor than said stainless steel.

9. The apparatus of claim 8 wherein said electrode is composed of a metal selected from a list consisting of copper, silver, aluminum, and an alloy containing one or more of copper, silver and aluminum.

10. An apparatus for generating HHO, the apparatus comprising:
   a. a case, said case having an inside and an outside and defining an interior volume;
   b. a core disposed within said interior volume of said case, said core being configured to generate HHO when a liquid electrolyte is contained within said interior volume, at least a portion of said core is immersed in said liquid electrolyte, and a DC current is passed through said core wherein said core comprises:
      i. a plurality of first core plates and a plurality of second core plates, each of said first and second core plates being generally rectangular in shape and defining a corner and an opposing corner;
      ii. a first and a second elongated core fastener, said first elongated core fastener electrically connecting each of said first core plates proximal to said corner, said second elongated core fastener electrically connecting each of said second core plates proximal to said opposing corner, said corner and said opposing corner being in diagonal opposition;
      iii said first core plates being in a spaced-apart relation along said first elongated core fastener and said second core plates being in a spaced-apart relation along said second elongated core fastener,
   said first plurality of core plates and said second plurality of core plates being interleaved so that each of said first and said second core plates is adjacent to at least one of the other of said first and said second core plates, said first and said second plurality of core plates being in a spaced apart relation so that none of said first core plates touches any of said second core plates, each of said core plates being generally parallel to each other of said core plates, whereby said second elongated core plate fastener is in diagonal opposition to said first elongated core plate fastener.

11. The apparatus of claim 10 wherein each said first core plate defining a clearance cutout proximal to said opposing corner of said first core plate, each said second core plate defining said clearance cutout proximal to said corner of said second core plate, said clearance cutout being configured such that each of said first and said second core plates does not touch said elongated core fastener that is attached to the other of said first and said second core plates, whereby said clearance cutouts of said second plates are in diagonal opposition to said clearance cutouts of said first plates.

12. The apparatus of claim 11 wherein said first elongated fastener is a first bolt, said second elongated fastener is a second bolt, the apparatus further comprising: a plurality of first washers and a plurality of second washers, said first washers being located on said first bolt and interposed between each of said first core plates, said second washers being located on said second bolt and interposed between each of said second core plates, said first washers defining said spaced-apart relation of said first core plates, said second washers defining said spaced-apart relation of said second core plates, said first bolt securely connecting said first core plates and said first washers, said second bolt securely connecting said second core plates and said second washers.

13. The apparatus of claim 10, the apparatus further comprising: a non-conducting core plate connector, said non-conducting core plate connector mechanically connecting said first and said second core plates, said non-conducting core plate connector not electrically connecting said first and said second core plates.

14. A method of generating HHO, the method comprising:
   a. providing a case, said case having an inside and an outside and defining an interior volume, said case defining an electrode penetration communicating through said case from said outside to said inside;
   b. providing a liquid electrolyte, said liquid electrolyte being contained within said interior volume of said case;
   c. providing a core disposed within said interior volume of said case, said core being configured to generate HHO when at least a portion of said core is immersed in said liquid electrolyte and a DC current is passed through said core, said electrolyte having an electrolyte level when said core is generating HHO, said electrode penetration being located below said electrolyte level;
   d. providing an electrode, said electrode being disposed within said case penetration and communicating between said outside and said inside of said case;
   e. providing a support plate, said support plate being located within said interior volume, said support plate being attached to said electrode and to said core, said electrode being in electrical communication with said core through said support plate, said support plate supporting said core within said interior volume;
   f. providing a non-conducting bushing, said non-conductive bushing defining a bushing opening, said electrode being disposed within said bushing opening, said non-conductive bushing being disposed between said support plate and said inside of said case, said case being electrically conductive, said support plate being electrically insulated from said case by said bushing, said electrode being under tension, said tension clamping said non-conductive bushing between said support plate and said inside of said case, said non-conductive bushing having a configuration, said configuration being selected to prevent contact between said electrolyte and said electrode and to prevent escape of electrolyte or HHO through said electrode penetration when said electrolyte is contained within said interior volume of said case;
   g. applying a DC voltage to said core through said electrode and said support plate;
   h. collecting HHO generated by said core.

15. The method of claim 14 wherein said electrode penetration is located below a level of said electrolyte in said case when said core is generating HHO and wherein said support plate is composed of a stainless steel and said electrode is composed of a metal selected from a list consisting of copper, silver, aluminum, and an alloy containing one or more of copper, silver or aluminum.

16. The method of claim 15 wherein said method comprises:
   a. providing a plurality of first core plates and a plurality of second core plates, each of said core plates being generally rectangular in shape, each said first and said second core plate defining a core plate perforation, each said core plate perforation being located proximal to a first corner of said core plate, each of said first and second core plates defining a clearance cutout located at a second corner of said core plate diagonally opposite to said core plate perforation;
   b. providing a first and a second elongated core fastener, said first core fastener being disposed within said core plate perforations of each of said first core plates, said second elongated core fastener being disposed within said core plate perforations of each of said second core plates;

c. said first core plates being in a spaced-apart relation along said first elongated core fastener and said second core plates being in a spaced-apart relation along said second core plate fastener;

d. providing a first and a second core connector, said first elongated fastener being attached to said first core connector, said second elongated fastener being attached to said second core connector, said plurality of first core plates and said plurality of second core plates being interleaved so that each of said first and said second core plates is adjacent to at least one of the other of said first and said second core plates, said first and said second plurality of core plates being in a spaced apart relation so that none of said first core plates touches any of said second core plates, each of said core plates being generally parallel to each other of said core plates, said core plates, said elongated core fasteners and said core connectors together defining said core.

17. The method of claim 16 wherein said electrode being a first electrode, said support plate being a first support plate, and said non-conductive bushing being a first non-conductive bushing, the method further comprising:

a. providing a second electrode disposed within a second electrode penetration through said case, said second electrode being attached to a second support plate, said second support plate being disposed within said case;

b. providing a second non-conductive bushing being disposed between said second support plate and said inside of said case, said second bushing and said second support plate being configured to prevent contact between said electrolyte and said second electrode and to seal said second electrode penetration against leakage of said electrolyte and said hydrogen;

b. providing a plurality of cores, said core being a one of said plurality of cores, each of said plurality of cores defining said three-dimensional rectangular shape, said plurality of cores being electrically connected in series between said first electrode and said second electrode and through said first and said second support plates, wherein said plurality of cores includes a first end core and a second end core, said first core connector of said first end core being attached to said first support plate, said second core connector of said second end core being attached to said second support plate, each other core connector defining said first core connector of a one of said cores and a second core connector of another of said core.

* * * * *